US007689164B2

United States Patent
Nishio et al.

(10) Patent No.: US 7,689,164 B2
(45) Date of Patent: Mar. 30, 2010

(54) RELAY APPARATUS, COMMUNICATION TERMINAL, COMMUNICATION SYSTEM, AND SEMICONDUCTOR INTEGRATED CIRCUIT

(75) Inventors: Yuki Nishio, Kyoto (JP); Masataka Irie, Osaka (JP)

(73) Assignee: Panasonic Corporation, Osaka (JP)

( * ) Notice: Subject to any disclaimer, the term of this patent is extended or adjusted under 35 U.S.C. 154(b) by 510 days.

(21) Appl. No.: 11/712,479

(22) Filed: Mar. 1, 2007

(65) Prior Publication Data
US 2007/0206628 A1 Sep. 6, 2007

(30) Foreign Application Priority Data
Mar. 3, 2006 (JP) .............................. 2006-058518

(51) Int. Cl.
H04B 3/36 (2006.01)
H04B 7/14 (2006.01)

(52) U.S. Cl. .......................... 455/7; 455/11.1; 370/315

(58) Field of Classification Search ............... 455/7, 455/11.1, 517, 422.1, 41.2; 370/328, 445, 370/315, 336, 469, 222, 466.338, 432, 312
See application file for complete search history.

(56) References Cited

U.S. PATENT DOCUMENTS 7,567,540 B2 * 7/2009 Sakoda ..................... 370/338
2003/0203716 A1 * 10/2003 Takahashi et al. ........... 455/11.1
2005/0226204 A1 10/2005 Uehara
2006/0034315 A1 * 2/2006 Maekawa et al. ............ 370/432
2007/0086399 A1 * 4/2007 Akiyama .................... 370/338
2007/0091925 A1 * 4/2007 Miyazaki et al. ............. 370/469
2007/0097960 A1 * 5/2007 Kurobe et al. ............... 370/352
2008/0181161 A1 * 7/2008 Gi Kim et al. .............. 370/312
2009/0059841 A1 * 3/2009 Laroia et al. ................ 370/328

FOREIGN PATENT DOCUMENTS

JP 2005-151525 6/2005

OTHER PUBLICATIONS

International Standard ISO/IEC 8802-11:1999 (E) ANSI/IEEE Std 802.11, 1999 Edition (R2003), Part 11: Wireless LAN Medium Access Control (MAC) and Physical Layer (PHY) Specifications, IEEE-SA Standards Board.

* cited by examiner

*Primary Examiner*—Sujatha Sharma
(74) *Attorney, Agent, or Firm*—McDermott Will & Emery LLP

(57) ABSTRACT

The present invention relates to a wireless LAN (Local Area Network) communication system. Upon a timer unit 108 clocking a predetermined time T after an access point 100 has transmitted a beacon signal 200, a transmission frame control unit 105 generates a CTS frame 301, and transmits an error frame 401 via a transmission frame generation unit 106, a wireless transmission unit 107 and an antenna 109. Accordingly, upon receiving the CTS frame 301, a communication terminal 20 ceases transmitting data for a NAV (Network Allocation Vector, transmission prohibition interval) period in accordance with IEEE 802.11 standard.

15 Claims, 21 Drawing Sheets e: ERROR FRAME TRANSMISSION PERIOD
m: PERIOD FROM COMPLETED TRANSMISSION OF ERROR FRAME UNTIL BEACON TRANSMISSION
n: IFS + BACK-OFF PERIOD

IFS: Inter Frame Space
FRAME INTERVAL e: ERROR FRAME TRANSMISSION PERIOD
m: PERIOD FROM COMPLETED TRANSMISSION OF
   ERROR FRAME UNTIL BEACON TRANSMISSION
n: IFS + BACK-OFF PERIOD IFS: Inter Frame Space
    FRAME INTERVAL a: PERIOD FROM COMPLETED TRANSMISSION OF CTS FRAME UNTIL BEACON TRANSMISSION
b: BEACON TRANSMISSION PERIOD
c: CTS TRANSMISSION PERIOD
d: NAV PERIOD i : PERIOD FROM COMPLETED TRANSMISSION OF
    PLCP HEADER UNTIL BEACON TRANSMISSION
l : Length PERIOD INCLUDED IN PLCP HEADER Length FIELD
b : BEACON TRANSMISSION PERIOD e: ERROR FRAME TRANSMISSION PERIOD
m: PERIOD FROM COMPLETED TRANSMISSION OF ERROR FRAME UNTIL BEACON TRANSMISSION
n: IFS + BACK-OFF PERIOD IFS: Inter Frame Space
FRAME INTERVAL a: PERIOD FROM COMPLETED TRANSMISSION OF CTS FRAME UNTIL BEACON TRANSMISSION
b: BEACON TRANSMISSION PERIOD
c: CTS TRANSMISSION PERIOD
d: NAV PERIOD i : PERIOD FROM COMPLETED TRANSMISSION OF
    PLCP HEADER UNTIL BEACON TRANSMISSION
l : Length PERIOD INCLUDED IN PLCP HEADER Length FIELD
b : BEACON TRANSMISSION PERIOD

⟷ CARRIER SENSING IS POSSIBLE

⟵--⟶ CARRIER SENSING IS NOT POSSIBLE

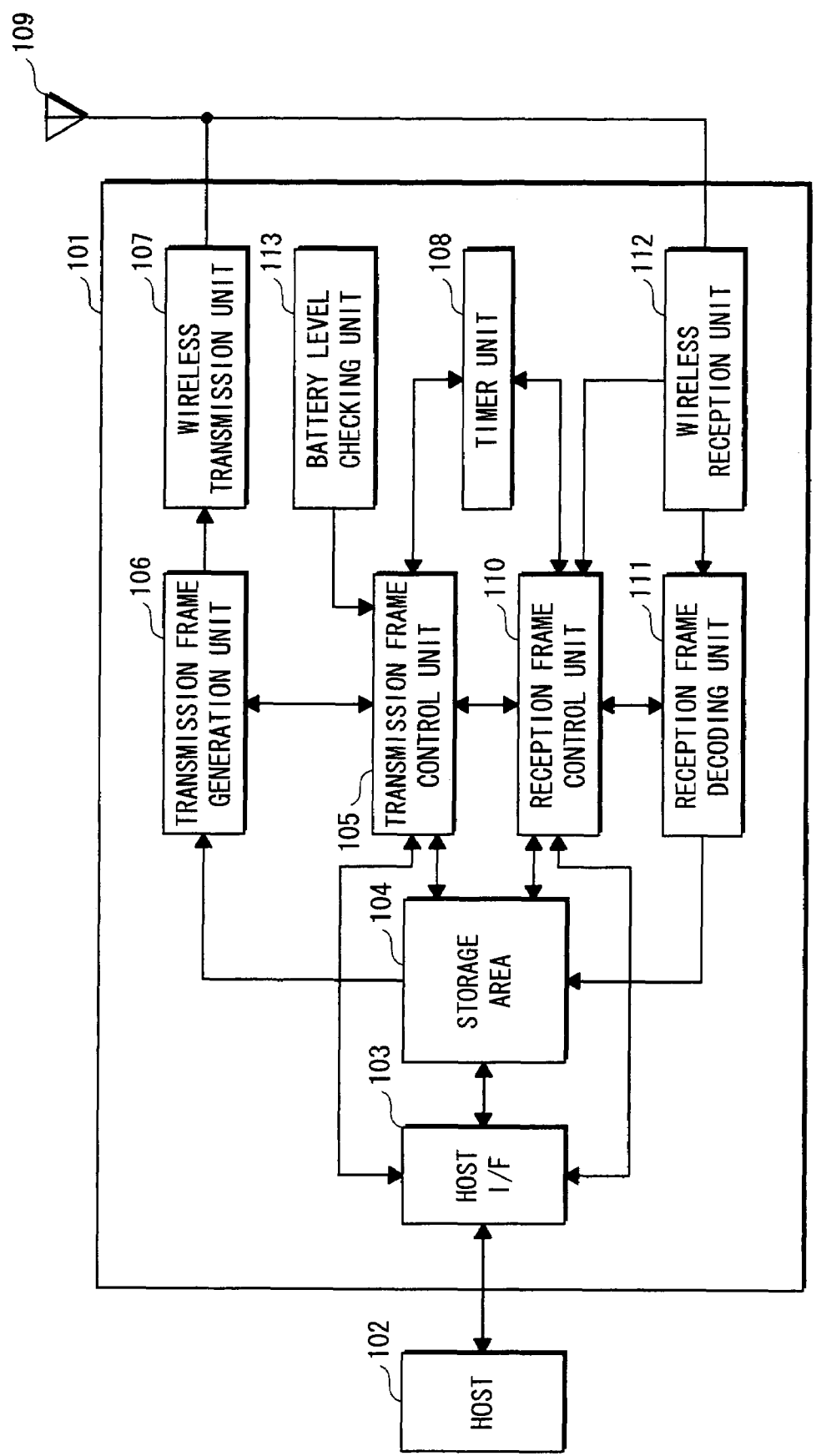

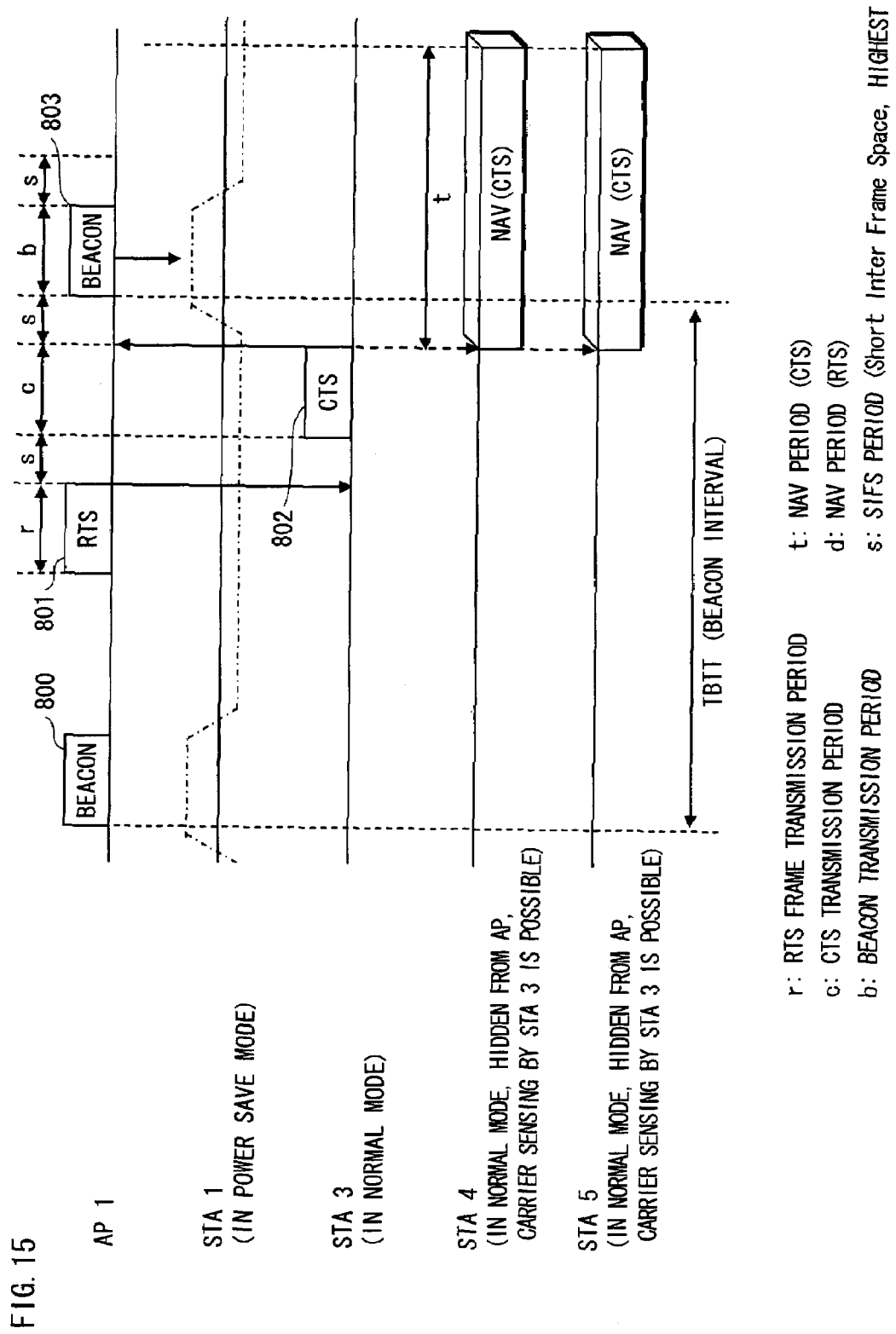

RELAY APPARATUS, COMMUNICATION TERMINAL, COMMUNICATION SYSTEM, AND SEMICONDUCTOR INTEGRATED CIRCUIT

BACKGROUND OF INVENTION

1. Field of the Invention

The present invention relates to a wireless LAN (Local Area Network) communication system, and in particular to communication terminals and a relay apparatus that relays communication between the communication terminals in the communication system.

2. Related Art

In recent years, wireless LANs have come to include a communication mode called "infrastructure mode" in which two or more communication terminals perform communication with each other via a specified relay apparatus (hereinafter, called an access point) that controls the network.

IEEE (Institute of Electrical and Electronic Engineers) 802.11 is a typical wireless LAN standard. The IEEE 802.11 standard is described in the following document:

"International Standard ISO/IEC 8802-11: 1999 (E) ANSI/IEEE Std 802.11, 1999 Edition, Part 11: Wireless LAN Media Access Control (MAC) and Physical Layer (PHY) Specifications"

In the IEEE 802.11 standard, when performing communication in the infrastructure mode for example, the access point transmits a beacon signal to each of the communication terminals on the network. The beacon signal includes an SSID (Service Set Identifier) which is an identifier of the access point, management information such as information regarding communication speeds supported by the access point, as well as information indicating whether data addressed to the terminals is stored in the access point.

Receiving the beacon signal enables the communication terminals to be prepared for the transmission/reception of data at any time.

Also, the communication terminals maybe set to a "power save mode" for suppressing consumption of battery power in the terminals.

A communication terminal set to the power save mode operates a reception unit therein only when receiving the beacon signal from the access point, and does not allow the reception unit to operate at any other time, thereby reducing power consumption while still reliably receiving the beacon signal to prepare for transmission/reception. For this reason, if reception of the beacon signal fails, the power save mode is ended, and the communication terminal must standby for reception at all times in order to ensure the reliability of data reception.

However, in the aforementioned wireless LAN, the access point may not be able to appropriately transmit the beacon signal to each of the communication terminals.

Specifically, in the aforementioned wireless LAN, the communication terminals and the access point perform multiple access in accordance with the CSMA/CA (Carrier Sense Multiple Access with Collision Avoidance) method.

For this reason, if data is being exchanged on the network when the access point intends to transmit the beacon signal, a packet collision is predicted, and the beacon signal therefore cannot be transmitted. Also, if the access point receives other data directly before transmitting the beacon signal, there is the possibility that the beacon signal will not be transmitted since data transmission is ceased for a predetermined interval after the reception of data.

In particular, if reception of the beacon signal fails even once while the communication terminal is set to the power save mode, the power save mode is forcedly ended, which is a hindrance to power saving.

The following is a more detailed description with reference to FIG. 21.

In a wireless LAN composed of, for example, an access point (AP) and communication terminals (STA 1 and STA 2) as shown in FIG. 21, the AP transmits the beacon signal at a predetermined time interval (TBTT). However, after the AP has transmitted a beacon signal 2000, a collision occurs between the next beacon signal 2001 and data 2002 since the STA 2 transmits the data 2002 at the same time as the AP transmits the beacon signal 2001, and therefore transmission of the beacon signal 2001 fails. Consequently, the STA 1 that was set to the power save mode does not receive the beacon signal, and must therefore end the power save mode and stay awake.

An aim of the present invention is therefore to provide technology in which an access point can more reliably transmit a beacon signal to communication terminals in a wireless LAN.

SUMMARY OF INVENTION

In order to solve the above problem, a relay apparatus of the present invention relays communication between a plurality of communication terminals in accordance with access control by CSMA/CA method, the relay apparatus including: a transmission unit operable to transmit, to the plurality of communication terminals, a beacon signal at a predetermined time interval Tb, and a predetermined signal for causing the plurality of communication terminals to cease signal transmission for a predetermined time period t; and a control unit operable to control the transmission unit to transmit the predetermined signal upon elapse of a predetermined time period T after transmission of the beacon signal, the predetermined time period T satisfying $Tb-t<T<Tb$.

According to this structure, by transmitting the predetermined signal to the communication terminals before transmitting the beacon signal, the relay apparatus can cause the communication terminals that received the predetermined signal to cease transmitting data for a predetermined time period, and can transmit the beacon signal while the communication terminals have ceased transmitting data. This enables transmitting beacon signals with increased reliability since signal collisions can be prevented.

Also, each of the communication terminals may have a power save mode for suppressing consumption of battery power therein, and remain in the power save mode in a case of receiving the beacon signal at the predetermined time interval Tb.

This structure enables highly reliably preventing a communication terminal set to the power saving mode from reverting from the power saving mode due to failing to receive the cyclically transmitted beacon signal.

Also, the plurality of communication terminals and the relay apparatus may comply with IEEE 802.11 standard, the predetermined signal may be an error frame, and the predetermined time period t may be a total of an IFS period and a back-off period that are specified in the IEEE 802.11 standard.

According to this structure, in the case of the wireless LAN complying with the IEEE 802.11 standard, the relay apparatus can transmit the beacon signal while the communication terminals have, due to receiving the error frame from the relay apparatus, ceased transmitting data for the predetermined time period (IFS+back-off) specified in the standard.

Also, the plurality of communication terminals and the relay apparatus may comply with IEEE 802.11 standard, the predetermined signal may be a CTS frame specified in the IEEE 802.11 standard, and the predetermined time period t may be a period indicated by a NAV included in the CTS frame.

According to this structure, in the case of the wireless LAN complying with the IEEE 802.11 standard, the relay apparatus can transmit the beacon signal while the communication terminals have, due to receiving the CTS specified by the standard from the relay apparatus, ceased transmitting data for the predetermined time period called a NAV (Network Allocation Vector), which is indicated in the CTS. The relay apparatus can adjust the time period for which the communication terminals cease transmitting data, by specifying a predetermined NAV when transmitting the CTS.

Furthermore, the plurality of communication terminals and the relay apparatus may comply with IEEE 802.11 standard, the predetermined signal may be a PLCP header specified in the IEEE 802.11 standard, and the predetermined time period t may be a period indicated by a Length included in the PLCP header.

According to this structure, in the case of the wireless LAN complying with the IEEE 802.11 standard, the relay apparatus can transmit the beacon signal while the communication terminals have, due to receiving the PLCP header specified by the standard from the relay apparatus, ceased transmitting data for the predetermined time period (Length), which is indicated in the PLCP header. The relay apparatus can adjust the time period for which the communication terminals cease transmitting data, by specifying a predetermined Length when transmitting the PLCP header.

Also, in order to solve the above problem, a relay apparatus of the present invention, in accordance with access control by CSMA/CA method, mediates communication between a plurality of communication terminals, the relay apparatus and the plurality of communication terminals ceasing signal transmission for a predetermined time period t upon receiving a signal, the relay apparatus including: a transmission unit operable to transmit a signal to the plurality of communication terminals; and a control unit operable to control the transmission unit to, exclusively in a case of transmitting a beacon signal, perform transmission regardless of the predetermined time period t.

According to this structure, the relay apparatus can reliably perform transmission of exclusively the beacon signal, even if the transmission of data has been ceased due to receiving other data.

Also, in order to solve the above problem, a communication system of the present invention includes a plurality of communication terminals and a relay apparatus that, in accordance with access control by CSMA/CA method in compliance with IEEE 802.11 standard, relays communication between the plurality of communication terminals, the plurality of communication terminals and the relay apparatus ceasing signal transmission for a predetermined time period t upon receiving a signal, the relay apparatus including: a reception unit operable to receive a CTS frame; a transmission unit operable to transmit, to the plurality of communication terminals, a beacon signal at a predetermined time interval Tb, and an RTS frame; and a control unit operable to control the transmission unit to transmit the RTS frame upon elapse of a predetermined time period T after transmission of the beacon signal, the predetermined time period T satisfying Tb−t<T<Tb, and each of the communication terminals including: a reception unit operable to receive the RTS frame and the CTS frame; a transmission unit operable to, upon reception of the RTS frame, transmit a CTS frame in response thereto to the relay apparatus and the other one or more of the communication terminals; and a control unit operable to control the transmission unit of the communication terminal to, upon reception of the CTS frame, cease signal transmission for a period indicated by a NAV included in the received CTS frame.

According to this structure, in the case of the wireless LAN complying with the IEEE 802.11 standard, the relay apparatus that transmits the RTS frame and the communication terminal that transmits the CTS frame in response to the RTS frame can cooperate to cause the other one or more communication terminals to cease transmitting data. If, for example, there is a terminal in the network that temporarily cannot perform communication with the relay apparatus to receive an RTS frame due to a radio wave-blocking object between the terminal and the relay apparatus, due to the terminal moving far away, etc., the terminal can highly reliably receive, from the other communication terminal that can favorably perform communication with the relay apparatus, the CTS frame for ceasing data transmission.

Also, in the communication system, the control unit of each of the communication terminals may be further operable to check a battery level in the communication terminal, the transmission unit of each of the communication terminals may be further operable to transmit a signal indicating the checked battery level to the relay apparatus, the reception unit of the relay apparatus may be further operable to receive the signal indicating the checked battery level from each of the communication terminals, and the transmission unit of the relay apparatus may transmit the RTS frame to, from among the plurality of communication terminals, a communication terminal having a highest battery level.

This structure enables the relay apparatus to transmit the RTS frame to the communication terminal that can most afford to transmit the CTS frame, that is to say, the communication terminal with the highest battery level.

Furthermore, in the communication system, the control unit of each of the communication terminals may be further operable to check a communication quality thereof, the transmission unit of each of the communication terminals may be further operable to transmit a signal indicating the communication quality to the relay apparatus, the reception unit of the relay apparatus may be further operable to receive the signal indicating the communication quality from each of the communication terminals, and the transmission unit of the relay apparatus may transmit the RTS frame to, from among the plurality of communication terminals, a communication terminal having a worst communication quality.

This structure enables the relay apparatus to transmit the RTS frame to the communication terminal with the poorest communication quality, that is to say, the communication terminal that is most likely to be farthest from the relay apparatus. This makes it possible for the farthest communication terminal that can perform communication with the relay apparatus to transmit the CTS frame, thereby enabling the relay apparatus to cause a communication terminal that is far away and cannot communicate with the relay apparatus to cease transmitting data.

Also, in order to solve the above problem, a communication terminal of the present invention performs communication with another communication terminal via a relay apparatus in accordance with access control by CSMA/CA method, the communication terminal including: a reception unit operable to receive a beacon signal from the relay apparatus at a predetermined time interval Tb, and a predetermined signal for ceasing signal transmission for a predetermined time period t; a transmission unit operable to transmit the predetermined signal to the relay apparatus and the another communication terminal upon elapse of a predetermined time period T after reception of the beacon signal, the predetermined time period T satisfying Tb−t<T<Tb; and a control unit operable to control the transmission unit to, upon reception of the predetermined signal, cease signal transmission for the predetermined time period t.

According to this structure, the communication terminal transmits the predetermined signal before transmission of the beacon signal by the relay apparatus, thereby enabling causing the communication terminals that received the predetermined signal to cease transmitting data for a predetermined time. This increases the reliability that the beacon signal will be transmitted, since the relay apparatus transmits the beacon signal while the communication terminals have ceased transmitting data.

Also, the communication terminal and the relay apparatus may comply with IEEE 802.11 standard, the predetermined signal may be an error frame, and the predetermined time period t may be a total of an IFS period and a back-off period that are specified in the IEEE 802.11 standard.

According to this structure, in the case of the wireless LAN complying with the IEEE 802.11 standard, the relay apparatus can transmit the beacon signal while the communication terminals have, due to receiving the error frame, ceased transmitting data for the predetermined time period (IFS+back-off) specified in the standard.

Also, the communication terminal and the relay apparatus may comply with IEEE 802.11 standard, the predetermined signal may be a CTS frame specified in the IEEE 802.11 standard, and the predetermined time period t may be a period indicated by a NAV included in the CTS frame.

According to this structure, in the case of the wireless LAN complying with the IEEE 802.11 standard, the relay apparatus can transmit the beacon signal while the communication terminals have, due to receiving the CTS specified by the standard, ceased transmitting data for the predetermined time period (NAV), which is indicated in the CTS.

Furthermore, the communication terminal and the relay apparatus may comply with IEEE 802.11 standard, the predetermined signal may be a PLCP header specified in the IEEE 802.11 standard, and the predetermined time period t may be a period indicated by a Length included in the PLCP header.

According to this structure, in the case of the wireless LAN complying with the IEEE 802.11 standard, the relay apparatus can transmit the beacon signal while the communication terminals have, due to receiving the PLCP header specified by the standard from the relay apparatus, ceased transmitting data for the predetermined time period (Length), which is indicated in the PLCP header.

Also, in order to solve the above problem, a semiconductor integrated circuit of the present invention includes: a transmission unit operable to transmit, to an external device, a beacon signal at a predetermined time interval Tb, and a predetermined signal for causing the external device to cease signal transmission for a predetermined time period t; and a control unit operable to control the transmission unit to transmit the predetermined signal upon elapse of a predetermined time period T after transmission of the beacon signal, the predetermined time period T satisfying Tb−t<T<Tb.

According to this structure, the semiconductor integrated circuit transmits the predetermined signal to the external device before transmitting the beacon signal, thereby enabling causing the external device that have received the predetermined signal to cease transmitting data for a predetermined time, and enabling the semiconductor integrated circuit to transmit the beacon signal while the external device has ceased transmitting data.

Also, in order to solve the above problem, a semiconductor integrated circuit of the present invention includes: a reception unit operable to receive a beacon signal from an external device at a predetermined time interval Tb, and a predetermined signal for ceasing signal transmission for a predetermined time period t; a transmission unit operable to transmit the predetermined signal to the external device upon elapse of a predetermined time period T after reception of the beacon signal, the predetermined time period T satisfying Tb−t<T<Tb; and a control unit operable to control the transmission unit to, upon reception of the predetermined signal, cease signal transmission for the predetermined time period t.

According to this structure, the semiconductor integrated circuit transmits the predetermined signal before transmission of the beacon signal by an external device, thereby enabling causing other semiconductor integrated circuits that have received the predetermined signal to cease transmitting data for a predetermined time.

BRIEF DESCRIPTION OF DRAWINGS

These and other objects, advantages, and features of the invention will become apparent from the following description thereof taken in conjunction with the accompanying drawings which illustrate specific embodiments of the present invention.

In the drawings:

FIG. 11 is a block diagram showing a structure of the access point 100 according to embodiment 7;

FIG. 15 shows operations of the access point 100 and communication terminals 10 to 50 according to embodiment 7;

DETAILED DESCRIPTION OF PREFERRED EMBODIMENTS

Embodiments of the present invention are described below with reference to the drawings.

Embodiment 1

1. Overview

Figure 1:
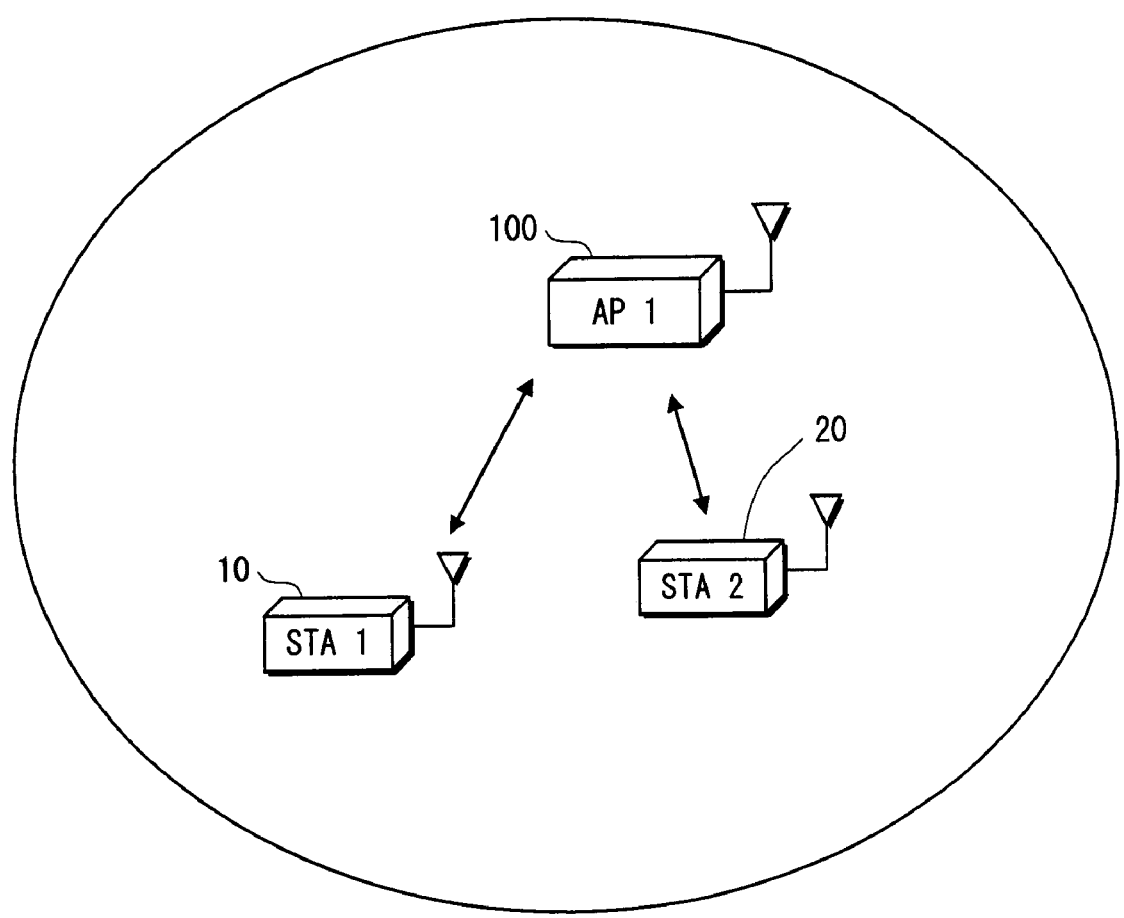
FIG. 1 shows a wireless LAN communication system according to embodiment 1 of the present invention.

First is a description of a wireless LAN communication system pertaining to embodiment 1 of the present invention, with reference to FIG. 1.

As shown in FIG. 1, the wireless LAN communication system of embodiment 1 includes a communication terminal 10 (STA 1), a communication terminal 20 (STA 2), and an access point 100 (AP 1), which is a wireless LAN base station.

The wireless LAN communication system conforms to the IEEE 802.11 standard, and is operated in accordance with access control by the CSMA/CA method.

The access point 100 is an apparatus that controls the wireless LAN, and is connected to a larger-scale network such as another LAN or the Internet, which is not depicted in FIG. 1. While set to an infrastructure mode, the access point 100 relays communication when the communication terminals 10 and 20 on the network perform communication with each other and with communication terminals on another wireless LAN.

1-1. CSMA/CA

The following is a brief description of access control by the CSMA/CA method.

In the CSMA/CA method, the communication apparatuses on the network, including the access point 100 and the communication terminals 10 and 20, must first check whether a communication channel has been idle for at least a predetermined time before transmitting data. The access point 100 and the communication terminals 10 and 20 therefore cease transmitting data for a predetermined time after receiving any kind of data.

For example, according to the IEEE 802.11 standard, when an error frame or normal data that is exchanged between the communication terminals 10 and 20 is received, data transmission is ceased for an IFS (Inter Frame Space) time plus a random time called a back-off (IFS+back-off).

As another example, according to the IEEE 802.11 standard, in the case of a CTS (Close To Send) signal used in a handshake between the transmission and reception sides, the transmitter of the CTS signal can specify a predetermined NAV time therein, and the receiver of the CTS signal ceases transmitting data for the NAV time.

As a further example, according to the IEEE 802.11 standard, in the case of a PLCP (Physical Layer Convergence Protocol) that is attached in the physical layer before the transmission of data, the transmitter of the PLCP header can specify a predetermined time period Length therein, and the receiver of the PLCP header ceases transmitting data for the Length time.

This completes the description of access control by the CSMA/CA method.

1-2. Infrastructure Mode

The following is a brief description of the infrastructure mode.

When in the infrastructure mode, the communication terminals 10 and 20 perform communication via the access point 100. Here, the access point 100 plays the role of controlling the network, and transmits a beacon signal at a predetermined cycle TBTT. The beacon signal includes information regarding an SSID of the access point 100, the TBTT, and supported communication speeds, as well as management information indicating whether data addressed to the communication terminals is stored in the access point 100.

The communication terminals 10 and 20 periodically receive the beacon signal in order to check whether data to be received is stored in the access point 100.

Also, the communication terminals 10 and 20 are provided with a power save mode for conserving battery power. When set to the power save mode, the communication terminals 10 and 20 perform reception only when receiving the beacon signal based on the TBTT included in the received beacon signal, and power off the transmission/reception unit at all other times. By receiving the beacon signal, the communication terminals 10 and 20 need only start the transmission/reception unit to return to normal mode if data addressed thereto is stored in the access point 100, and can continue the power save mode if data addressed thereto is not stored in the access point 100.

For this reason, if reception of the beacon signal fails while the communication terminal 10 or 20 is set to the power save mode, it is impossible to check whether data addressed thereto is stored in the access point 100, and the communication terminal 10 or 20 therefore forcibly ends the power save mode and reverts to a normal mode.

2. Structure of AP 1

Figure 2:
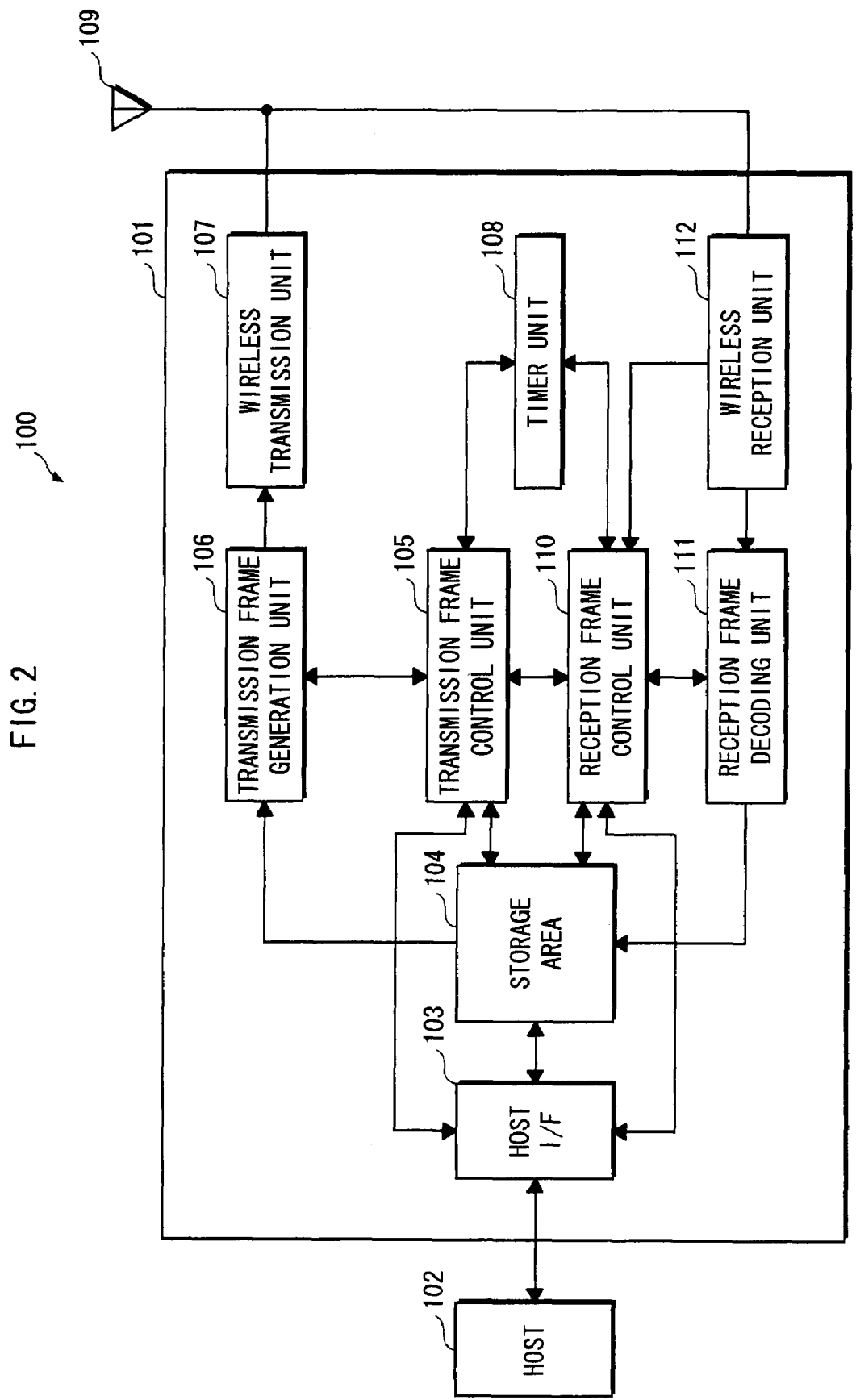
FIG. 2 is a block diagram showing a structure of an access point 100 according to embodiment 1.

The following describes a structure of the access point 100 with reference to FIG. 2.

As shown in FIG. 2, the access point 100 includes a host I/F 103, a storage area 104, a transmission frame control unit 105, a transmission frame generation unit 106, a wireless transmission unit 107, a timer unit 108, a reception frame control unit 110, a reception frame decoding unit 111, and a wireless reception unit 112 in a main body 101, as well as an antenna 109 on the outside of the main body 101.

Also, the access point 100 is connected to an external host 102. The host 102 notifies the access point 100 of data to be transmitted and a MAC (Media Access Control) address of the wireless LAN terminal to which the data is to be transmitted, and performs control by outputting data transmission instructions. More specifically, the host 102 is realized by a microcontroller etc. that is embedded in a PC (Personal Computer), household appliance, and the like.

The host I/F 103 is an interface for performing communication with the host 102, and is realized by, but not limited to, a bus standard such as PCI (Peripheral Component Interconnect). The host I/F 103 receives, from the host 102, data targeted for transmission, and sends the received data to the transmission frame control unit 105. The host I/F 103 also writes received MAC addresses of the STA 1 and STA 2 to the storage area 104.

The storage area 104 is a memory for storing various types of information necessary to wireless LAN communication, and in particular, stores the data targeted for transmission and the MAC addresses received from the host I/F 103, and data received from the reception frame control unit 110, which is described later.

In a case of transmitting data, the transmission frame control unit 105 retrieves the data to be transmitted and the MAC address of the receiving device from the storage area 104, and sends the retrieved data and MAC address to the transmission frame generation unit 106.

Also, upon receiving, from the timer unit 108 that is described later, a clock of the predetermined cycle TBTT at which the beacon signal is to be transmitted, the transmission frame control unit 105 generates beacon signal data and sends the generated data to the transmission frame generation unit 106. Upon receiving, from the timer unit 108, a clock of a time T at which an error frame is to be transmitted ahead of the beacon signal, the transmission frame control unit 105 generates error frame data, and sends the generated data to the transmission frame generation unit 106. The error frame is composed of predetermined data which is received by the communication terminal 10 or 20 as an error with respect to the IEEE 802.11 standard.

The transmission frame generation unit 106 conforms to the IEEE 802.11 standard, and converts data received from the transmission frame control unit 105 to a frame format, attaches the MAC address to the frame to generate a transmission frame, and sends the generated transmission frame to the wireless transmission unit 107.

The wireless transmission unit 107 receives the transmission frame from the transmission frame generation unit 106, and transmits the received transmission frame via the antenna 109.

The wireless reception unit 112 receives a frame via the antenna 109, and sends the received frame to the reception frame decoding unit 111.

The reception frame decoding unit 111 decodes the frame received from the wireless reception unit 112 in accordance with the IEEE 802.11 standard, and sends the decoded frame to the reception frame control unit 110.

The reception frame control unit 110 writes reception data received from the reception frame decoding unit 111 to the storage area 104. Also, in accordance with the type of the received frame, the reception frame control unit 111 sends, to the transmission frame control unit 105, a predetermined time t specified by the IEEE 802.11 standard during which transmission is ceased upon reception of the frame.

The timer unit 108 conforms to the IEEE 802.11 standard, and clocks the predetermined cycle TBTT for cyclical transmission of the beacon signal, and the predetermined cycle T for transmission of an error frame ahead of the beacon signal. More specifically, T is a predetermined time that satisfies the condition $TBTT-(IFS+\text{"back-off"})<T<TBTT$.

3. Operations

Figure 3:
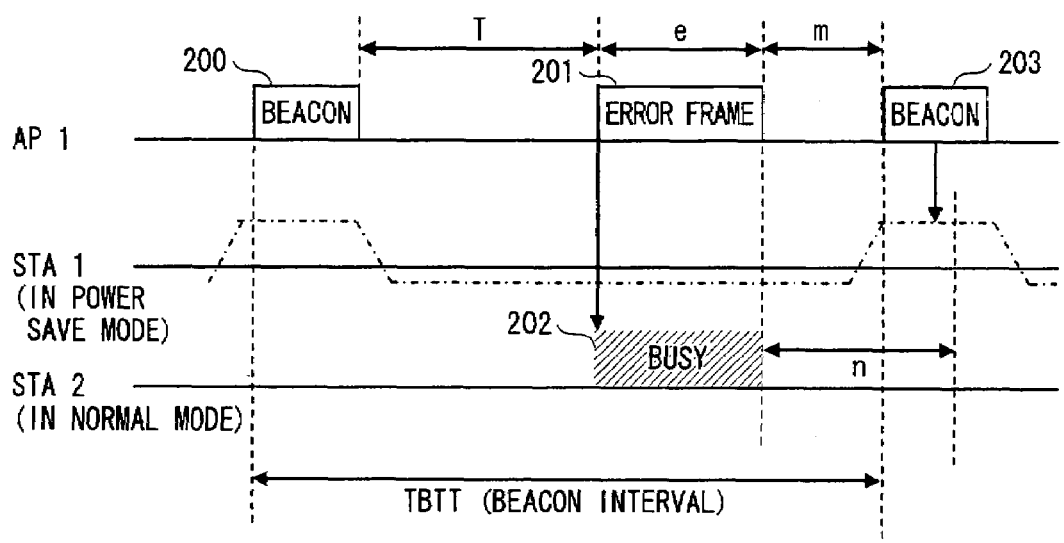
FIG. 3 shows operations of the access point 100 and communication terminals 10 and 20 according to embodiment 1.

The following describes operations of the access point 100 with reference to FIG. 3.

As shown in FIG. 3, the communication terminal 10 in the wireless LAN is set to the power save mode.

First, in the access point 100, upon the timer unit 108 clocking the TBTT, the transmission frame control unit 105 generates beacon signal data, the transmission frame generation unit 106 converts the generated data to a beacon signal frame, and the wireless transmission unit 107 transmits a beacon signal 200 via the antenna 109.

The communication terminal 10 starts up the reception unit based on the TBTT in the last-received beacon signal, in order to receive the beacon signal 200.

The communication terminal 20 receives the beacon signal 200 in the same way.

Upon the timer unit 108 clocking the predetermined time T after the access point 100 has completed transmission of the beacon signal 200, the transmission frame control unit 105 generates an error frame 201, and sends the generated error frame 201 to the transmission frame generation unit 106 and the wireless transmission unit 107 via the antenna 109.

Accordingly, when receiving the error frame 201, the communication terminal 20 passes through a busy state 202 (period e) during which the error frame 201 is received, and thereafter ceases transmitting data for the IFS+"back-off" period (period n), in accordance with the IEEE 802.11 standard.

After transmitting the error frame 201, the access point 100 transmits a beacon signal 203 at a next timing when a period m has passed.

Here, since the time T, which is from when the beacon signal 200 has been transmitted until when the error frame 201 is transmitted, satisfies the condition $TBTT-(IFS+\text{"back-off"})<T<TBTT$, the access point 100 transmits the error frame 201 after transmitting the beacon signal 200 and before transmitting the beacon signal 203. Furthermore, the access point 100 can transmit the beacon signal 203 after transmitting the error frame 201, during the IFS+back-off period (period n) for which the communication terminal 20 ceases transmitting data.

Accordingly, the access point 100 can more reliably transmit beacon signals, and the communication terminal 10 can more reliably continue the power save mode.

Embodiment 2

The following describes embodiment 2 of the present invention with reference to the drawings.

1. Overview

Whereas the access point 100 transmits an error frame ahead of the beacon signal in embodiment 1, in embodiment 2 the access point 100 transmits a CTS frame specified in the IEEE 802.11 standard.

2. Structure of AP 1

The following describes only aspects of the structure that differ from embodiment 1.

Upon the timer unit 108 clocking a time T at which the CTS frame is to be transmitted ahead of the beacon signal, the transmission frame control unit 105 determines a NAV to be included in the CTS frame, generates CTS frame data that includes the determined NAV, and sends the generated data to the transmission frame generation unit 106.

The timer unit 108 conforms to the IEEE 802.11 standard, and clocks the predetermined cycle TBTT for cyclical transmission of the beacon signal, and a predetermined cycle T for transmission of the CTS frame ahead of the beacon signal. More specifically, T is a predetermined time that satisfies the condition $TBTT-NAV<T<TBTT$.

3. Operations

Figure 4:
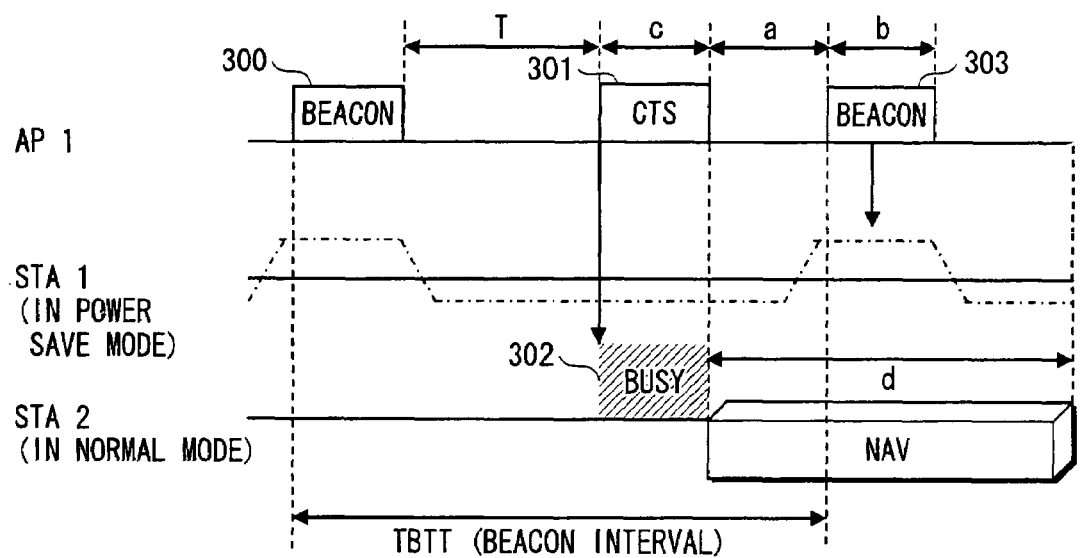
FIG. 4 shows operations of the access point 100 and the communication terminals 10 and 20 according to embodiment 2.

The following describes operations of the access point 100 with reference to FIG. 4.

As shown in FIG. 4, the communication terminal 10 in the wireless LAN is set to the power save mode.

First, in the access point 100, upon the timer unit 108 clocking the TBTT, the transmission frame control unit 105 generates beacon signal data, the transmission frame generation unit 106 converts the generated data to a beacon signal frame, and the wireless transmission unit 107 transmits a beacon signal 300 via the antenna 109.

The communication terminal 10 starts up the reception unit based on the TBTT in the last-received beacon signal, in order to receive the beacon signal 300.

The communication terminal 20 receives the beacon signal 300 in the same way.

Upon the timer unit 108 clocking the predetermined time T after the access point 100 has completed transmission of the beacon signal 300, the transmission frame control unit 105 generates a CTS frame 301, and transmits the generated CTS frame 301 via the transmission frame generation unit 106, the wireless transmission unit 107, and the antenna 109.

Accordingly, when receiving the CTS frame 301, the communication terminal 20 passes through a busy state 302 (period c) during which the CTS frame 301 is received, and thereafter ceases transmitting data for the NAV period (period d), in accordance with the IEEE 802.11 standard.

After transmitting the CTS frame 301, the access point 100 transmits a beacon signal 303 at a next timing when a period a has passed.

Here, since the time T, which is from when the beacon signal 300 has been transmitted until when the CTS frame 301 is transmitted, satisfies the condition TBTT−NAV<T<TBTT, the access point 100 transmits the CTS frame 301 after transmitting the beacon signal 300 and before transmitting the beacon signal 303. Furthermore, the access point 100 can transmit the beacon signal 303 after transmitting the CTS frame 301, during the NAV period (period d) for which the communication terminal 20 ceases transmitting data.

Accordingly, the access point 100 can more reliably transmit beacon signals, and the communication terminal 10 can more reliably continue the power save mode.

Furthermore, the access point 100 can adjust the period for which the communication terminal 20 ceases transmitting data by adjusting the NAV.

Embodiment 3

The following describes embodiment 3 of the present invention with reference to the drawings.

1. Overview

Whereas the access point 100 transmits an error frame ahead of the beacon signal in embodiment 1, in embodiment 3 the access point 100 transmits a PLCP header specified in the IEEE 802.11 standard.

Figure 5A:
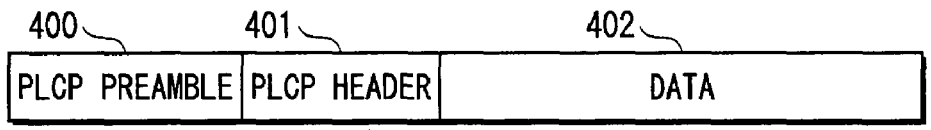
FIGS. 5A and 5B respectively show a data structure of a PLCP header and operations of the access point 100 and the communication terminals 10 and 20according to embodiment 3.

As shown in FIG. 5A, according to the IEEE 802.11 standard, a PLCP preamble 400 necessary for reception synchronization processing as well as a PLCP header 401 containing information such as a transfer rate and a frame length are attached to transmission data 402 in the physical layer.

2. Structure of AP 1

The following describes only aspects of the structure that differ from embodiment 1.

Upon the timer unit 108 clocking a time T at which the PLCP header is to be transmitted ahead of the beacon signal, the transmission frame control unit 105 determines a Length to be included in the PLCP header, generates a PLCP header that includes the determined Length, and sends the generated PLCP header to the transmission frame generation unit 106.

The timer unit 108 conforms to the IEEE 802.11 standard, and clocks the predetermined cycle TBTT for cyclical transmission of the beacon signal, and a predetermined cycle T for transmission of the PLCP header ahead of the beacon signal.

More specifically, T is a predetermined time that satisfies the condition TBTT−Length<T<TBTT.

3. Operations

Figure 5B:
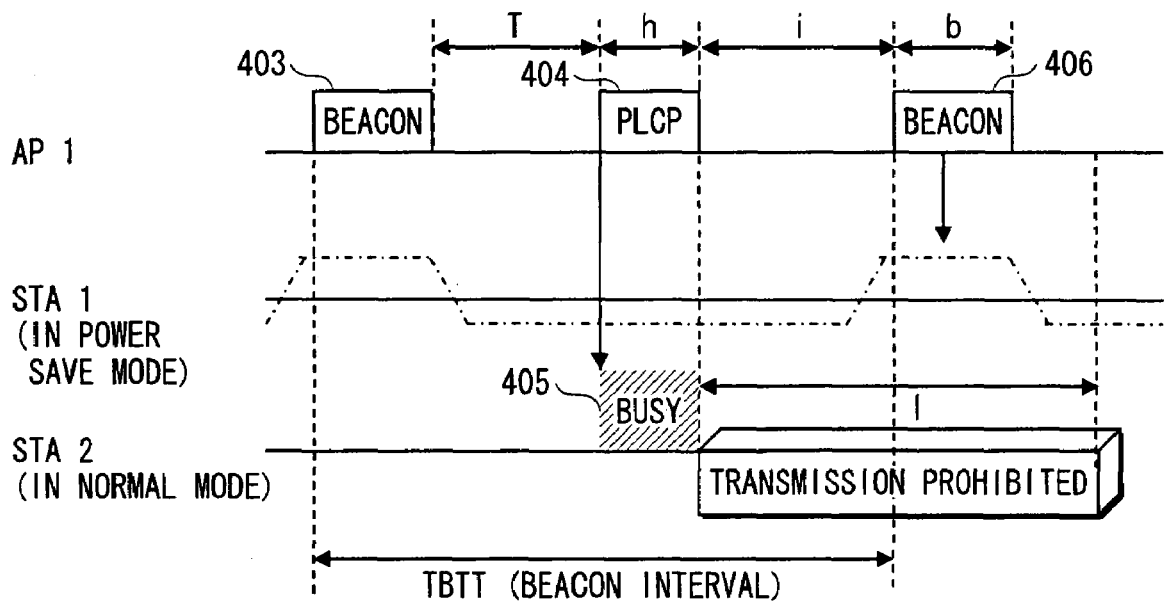

The following describes operations of the access point 100 with reference to FIG. 5B.

As shown in FIG. 5B, the communication terminal 10 in the wireless LAN is set to the power save mode.

First, in the access point 100, upon the timer unit 108 clocking the TBTT, the transmission frame control unit 105 generates beacon signal data, the transmission frame generation unit 106 converts the generated data to a beacon signal frame, and the wireless transmission unit 107 transmits a beacon signal 403 via the antenna 109.

The communication terminal 10 starts up the reception unit based on the TBTT in the last-received beacon signal, in order to receive the beacon signal 403.

The communication terminal 20 receives the beacon signal 403 in the same way.

Upon the timer unit 108 clocking the predetermined time T after the access point 100 has completed transmission of the beacon signal 403, the transmission frame control unit 105 generates a PLCP header 404, and transmits the generated PLCP header 404 via the transmission frame generation unit 106, the wireless transmission unit 107, and the antenna 109.

Accordingly, when receiving the PLCP header 404, the communication terminal 20 passes through a busy state 405 (period h) during which the PLCP header 404 is received, and thereafter ceases transmitting data for the Length period (period l), in accordance with the IEEE 802.11 standard.

After transmitting the PLCP header 404, the access point 100 transmits a beacon signal 406 at a next timing when a period i has passed.

Here, since the time T, which is from when the beacon signal 403 has been transmitted until when the PLCP header 404 is transmitted, satisfies the condition TBTT−Length<T<TBTT, the access point 100 transmits the PLCP header 404 after transmitting the beacon signal 403 and before transmitting the beacon signal 406. Furthermore, the access point 100 can transmit the beacon signal 406 after transmitting the PLCP header 404, during the Length period (period 1) for which the communication terminal 20 ceases transmitting data.

Accordingly, the access point 100 can more reliably transmit beacon signals, and the communication terminal 10 can more reliably continue the power save mode.

Furthermore, the access point 100 can adjust the period for which the communication terminal 20 ceases transmitting data by adjusting the Length period.

Moreover, in a case of transmitting a PLCP header, the PLCP header and the PLCP preamble may be transmitted without transmission data, thereby reducing the amount of data and suppressing the load on the network.

Embodiment 4

The following is a description of embodiment 4 with reference to the drawings.

1. Overview

In embodiment 4, a communication terminal 30 (STA 3) has been further added to the network of the wireless LAN communication system.

Whereas the access point 100 transmits an error frame, a CTS frame, or a PLCP header ahead of the beacon signal in embodiments 1 to 3, in embodiment 4 the communication terminal 30 transmits an error frame before the beacon signal is transmitted.

2-1. Structure of STA 3

Figure 6:
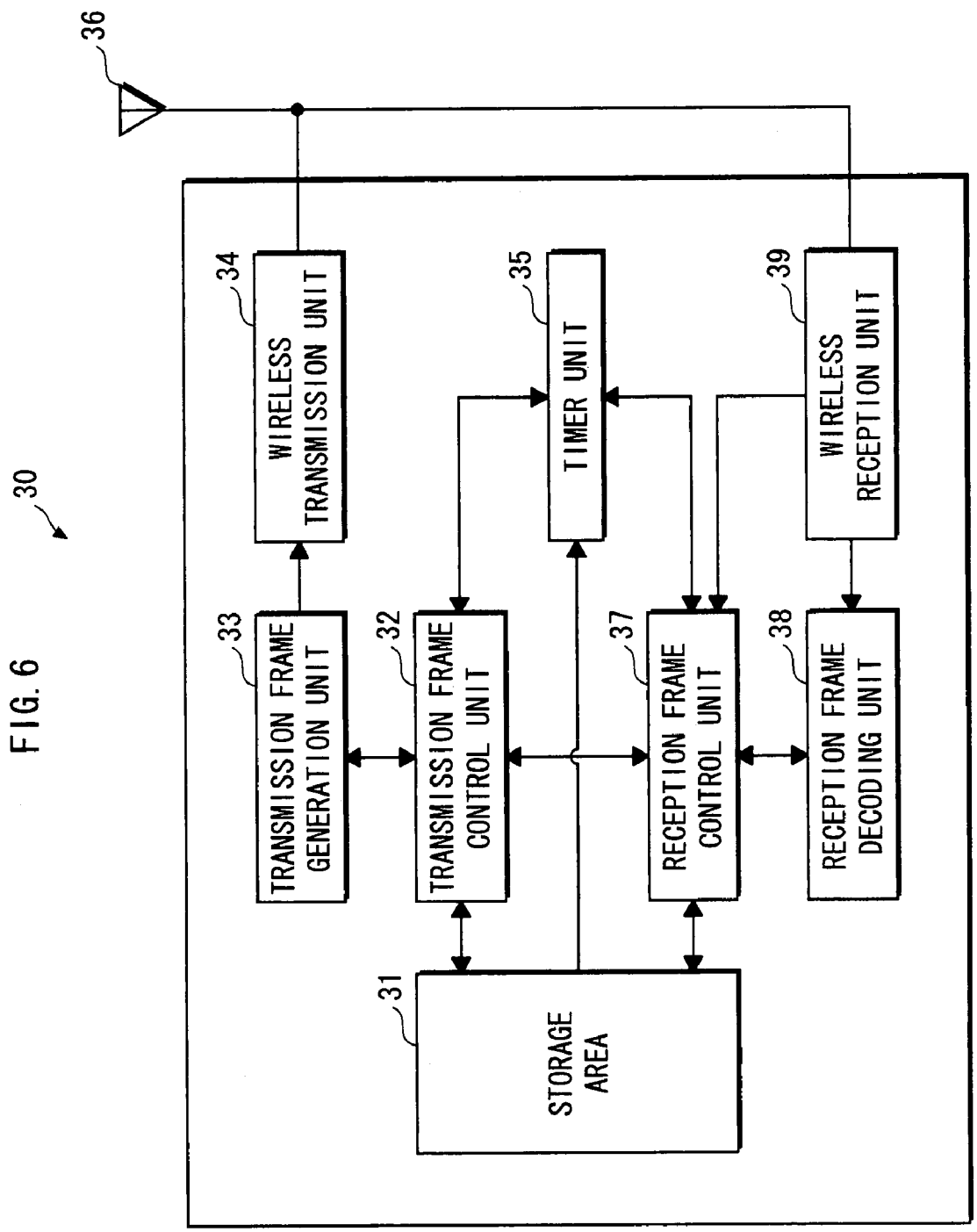
FIG. 6 is a block diagram showing a structure of a communication terminal 30 according to embodiment 4.

The following describes a structure of the communication terminal 30 with reference to FIG. 6.

As shown in FIG. 6, the communication terminal 30 includes a storage area 31, a transmission frame control unit 32, a transmission frame generation unit 33, a wireless transmission unit 34, a timer unit 35, an antenna 36, a reception frame control unit 37, a reception frame decoding unit 38, and a wireless reception unit 39.

The storage area 31 is a memory for storing various types of information necessary to wireless LAN communication, and in particular, stores an SSID received from the access point 100, the MAC addresses of the other communication terminals 10 and 20, and a TBTT which is a cycle according to which the access point 100 transmits the beacon signal.

In a case of transmitting data, the transmission frame control unit 32 retrieves the data to be transmitted and the MAC address of the receiving device from the storage area 31, and sends the retrieved data and MAC address to the transmission frame generation unit 33.

Also, upon receiving, from the timer unit 35 that is described later, a clock of a time T at which the error frame is to be transmitted, the transmission frame control unit 32 generates error frame data and sends the generated data to the transmission frame generation unit 33. The error frame is composed of predetermined data that is received by the communication terminal 10 or 20 as an error with respect to the IEEE 802.11 standard.

The transmission frame generation unit 33 conforms to the IEEE 802.11 standard, and converts data received from the transmission frame control unit 32 to a frame format, attaches the MAC address to the frame to generate a transmission frame, and sends the generated transmission frame to the wireless transmission unit 34.

The wireless transmission unit 34 receives the transmission frame from the transmission frame generation unit 33, and transmits the received transmission frame via the antenna 36.

The wireless reception unit 39 receives a frame via the antenna 36, and sends the received frame to the reception frame decoding unit 38.

The reception frame decoding unit 38 decodes the frame received from the wireless reception unit 39 in accordance with the IEEE 802.11 standard, and sends the decoded frame to the reception frame control unit 37.

The reception frame control unit 37 writes reception data received from the reception frame decoding unit 38 to the storage area 31. Also, in accordance with the type of the received frame, the reception frame control unit 37 transmits, to the transmission frame control unit 32, a predetermined time t specified by the IEEE 802.11 standard during which transmission is ceased for a predetermined time from reception of the frame.

The timer unit 35 clocks the predetermined cycle T for transmission of an error frame ahead of transmission of the beacon signal by the access point 100, based on the TBTT stored in the storage area 31. More specifically, T is a predetermined time that satisfies the condition TBTT−(IFS+"back-off")<T<TBTT.

2-2. Structure of AP 1

The following describes only aspects of the structure that differ from embodiment 1.

Upon the timer unit 108 clocking a predetermined cycle TBTT at which the beacon signal is to be transmitted, the transmission frame control unit 105 generates beacon signal data, and sends the generated data to the transmission frame generation unit 106.

In particular, if notification that the timer unit 108 has clocked the predetermined cycle TBTT is received during the predetermined time t during which data transmission must be ceased, the transmission frame control unit 105 ignores the data transmission prohibition and forcedly generates the beacon signal data.

The timer unit 108 conforms to the IEEE 802.11 standard, and clocks the predetermined cycle TBTT for cyclical transmission of the beacon signal.

3. Operations

Figure 7:
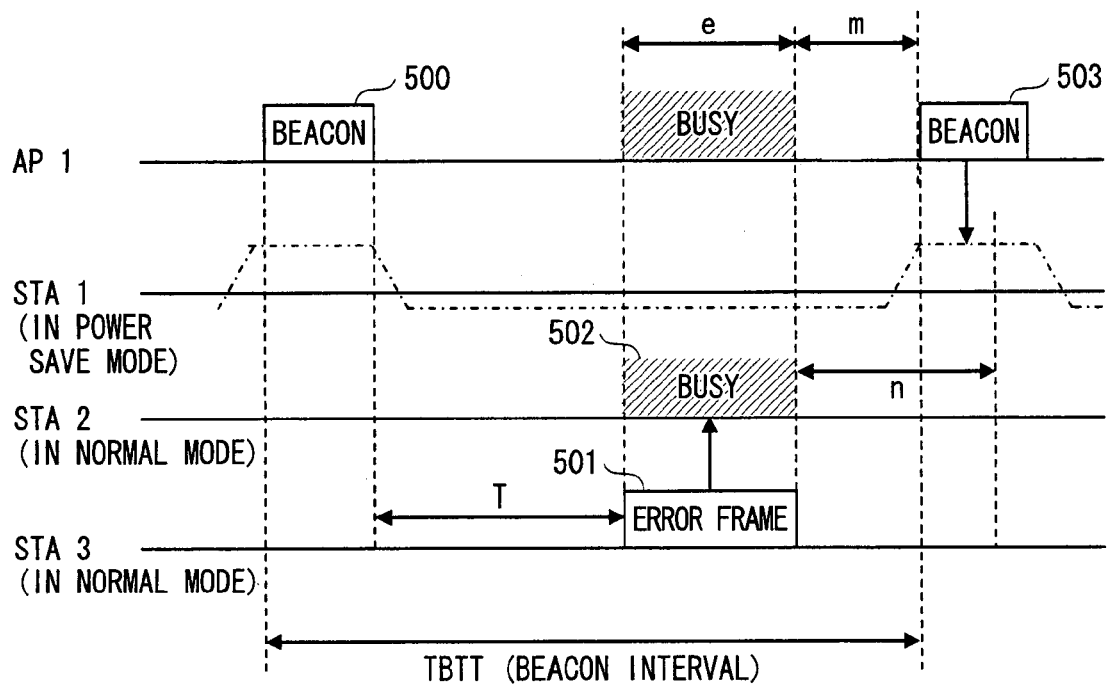
FIG. 7 shows operations of the access point 100 and the communication terminals 10 to 30 according to embodiment 4.

The following describes operations of the communication terminal 30 and the access point 100 with reference to FIG. 7.

As shown in FIG. 7, the communication terminal 10 in the wireless LAN is set to the power save mode.

First, in the access point 100, upon the timer unit 108 clocking the TBTT, the transmission frame control unit 105 generates beacon signal data, the transmission frame generation unit 106 converts the generated data to a beacon signal frame, and the wireless transmission unit 107 transmits a beacon signal 600 via the antenna 109.

The communication terminal 10 starts up the reception unit based on the TBTT in the last-received beacon signal, in order to receive the beacon signal 600.

The communication terminals 20 and 30 receive the beacon signal 600 in the same way.

Upon the timer unit 35 clocking the predetermined time T after the communication terminal 30 has received the beacon signal 600, the transmission frame control unit 32 generates an error frame 501, and transmits the generated error frame 501 via the transmission frame generation unit 33, the wireless transmission unit 34, and the antenna 36.

Accordingly, when receiving the error frame 501, the communication terminal 20 passes through a busy state 502 (period h) during which the error frame 501 is received, and thereafter ceases transmitting data for the IFS+"back-off" period (period n), in accordance with the IEEE 802.11 standard.

After completing reception of the error frame 501, the access point 100 ceases transmitting data for the IFS+back-off period similarly to the communication terminal 20. However, if the period m passes and the timer unit 108 clocks the TBTT, the access point 100 ignores the data transmission prohibition, and forcedly transmits a beacon signal 503.

Here, since the time T, which is from when the beacon signal 500 has been received until when the error frame 501 is transmitted, satisfies the condition TBTT−(IFS+"back-off")<T<TBTT, the communication terminal 30 transmits the error frame 501 after receiving the beacon signal 500 and before receiving the beacon signal 503. Furthermore, the access point 100 can transmit the beacon signal 503 after the communication terminal 30 has transmitted the error frame 501, during the IFS+back-off period (period n) for which the communication terminal 30 ceases transmitting data.

Accordingly, the access point 100 can more reliably transmit beacon signals, and the communication terminal 10 can more reliably continue the power save mode.

Also, the access point 100 can reduce the processing load since the error frame is transmitted by the communication terminal 30 ahead of the beacon signal.

Embodiment 5

The following describes embodiment 5 of the present invention with reference to the drawings.

1. Overview

Whereas the communication terminal 30 transmits an error frame ahead of the beacon signal in embodiment 4, in embodiment 5 the communication terminal 30 transmits a CTS frame specified in the IEEE 802.11 standard.

2. Structure of STA 3

The following describes only aspects of the structure that differ from embodiment 4.

Upon the timer unit 35 clocking a time T at which the CTS frame is to be transmitted, the transmission frame control unit 32 determines a NAV to be included in the CTS frame, generates CTS frame data that includes the determined NAV, and sends the generated data to the transmission frame generation unit 33.

The timer unit 35 clocks a predetermined cycle T for transmission of the CTS frame ahead of the beacon signal transmitted by the access point 100, based on the TBTT stored in the storage area 31. More specifically, T is a predetermined time that satisfies the condition TBTT−NAV<T<TBTT.

3. Operations

Figure 8:
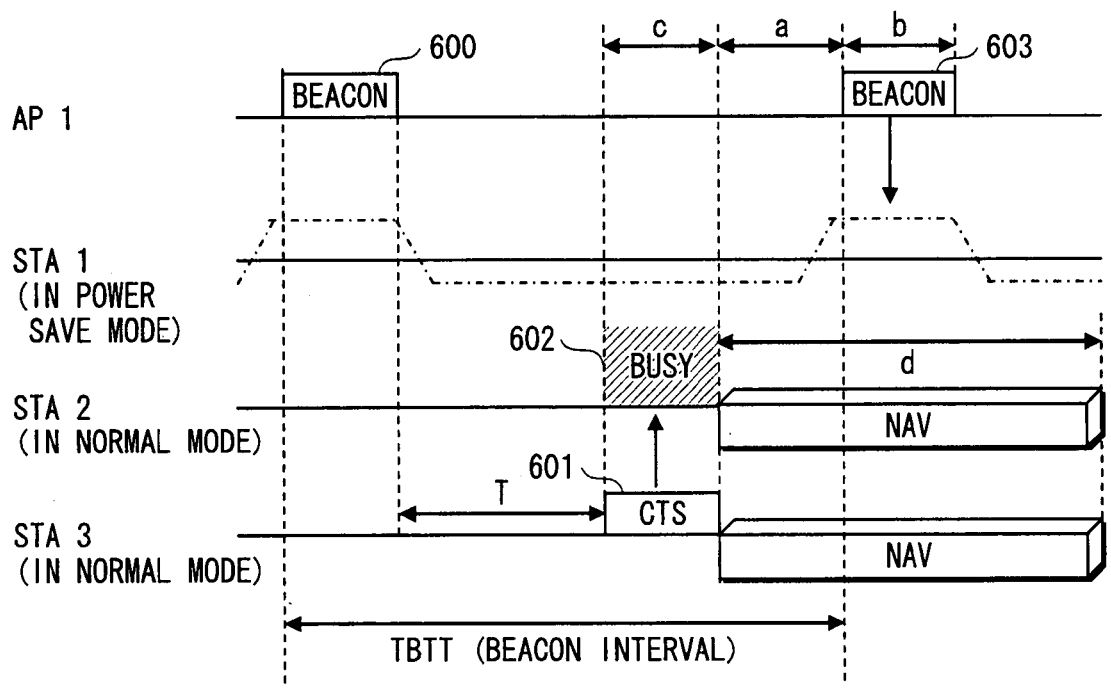
FIG. 8 shows operations of the access point 100 and the communication terminals 10 to 30 according to embodiment 5.

The following describes operations of the communication terminal 30 and the access point 100 with reference to FIG. 8.

As shown in FIG. 8, the communication terminal 10 in the wireless LAN is set to the power save mode.

First, in the access point 100, upon the timer unit 108 clocking the TBTT, the transmission frame control unit 105 generates beacon signal data, the transmission frame generation unit 106 converts the generated data to a beacon signal frame, and the wireless transmission unit 107 transmits a beacon signal 600 via the antenna 109.

The communication terminal 10 starts up the reception unit based on the TBTT in the last-received beacon signal, in order to receive the beacon signal 600.

The communication terminals 20 and 30 receive the beacon signal 600 in the same way.

Upon the timer unit 35 clocking the predetermined time T after the communication terminal 30 has received the beacon signal 600, the transmission frame control unit 32 generates a CTS frame 601, and transmits the generated CTS frame 601 via the transmission frame generation unit 33, the wireless transmission unit 34, and the antenna 36.

Accordingly, when receiving the CTS frame 601, the communication terminal 20 passes through a busy state 602 (period c) during which the CTS frame 601 is received, and thereafter ceases transmitting data for the NAV period (period d), in accordance with the IEEE 802.11 standard.

After completing reception of the CTS frame 601, the access point 100 ceases transmitting data for the NAV period similarly to the communication terminal 20. However, if the timer unit 108 clocks the TBTT after the period a has passed, the access point 100 ignores the data transmission prohibition, and forcedly transmits a beacon signal 603.

Here, since the time T, which is from when the beacon signal 600 has been received until when the CTS frame 601 is transmitted, satisfies the condition TBTT−NAV<T<TBTT, the communication terminal 30 transmits the CTS frame 601 after receiving the beacon signal 600 and before receiving the beacon signal 603. Furthermore, the access point 100 can transmit the beacon signal 603 after the communication terminal 30 has transmitted the CTS frame 601, during the NAV period (period d) for which the communication terminal 30 ceases transmitting data.

Accordingly, the access point 100 can more reliably transmit beacon signals, and the communication terminal 10 can more reliably continue the power save mode.

Also, the access point 100 can reduce the processing load since the CTS frame is transmitted by the communication terminal 30 ahead of the beacon signal.

Furthermore, the communication terminal 30 can adjust the period for which the communication terminal 20 ceases transmitting data by adjusting the NAV.

Embodiment 6

The following describes embodiment 6 of the present invention with reference to the drawings.

1. Overview

Whereas the communication terminal 30 transmits an error frame ahead of the beacon signal in embodiment 4, in embodiment 6 the communication terminal 30 transmits a PLCP header specified in the IEEE 802.11 standard.

2. Structure of STA 3

The following describes only aspects of the structure that differ from embodiment 4.

Upon the timer unit 35 clocking a time T at which the PLCP header is to be transmitted, the transmission frame control unit 32 determines a Length to be included in the PLCP header, generates PLCP header data that includes the determined Length, and sends the generated data to the transmission frame generation unit 33.

The timer unit 35 clocks a predetermined cycle T for transmission of the PLCP header ahead of the beacon signal transmitted by the access point 100, based on the TBTT stored in the storage area 31. More specifically, T is a predetermined time that satisfies the condition TBTT−Length<T<TBTT.

3. Operations

Figure 9:
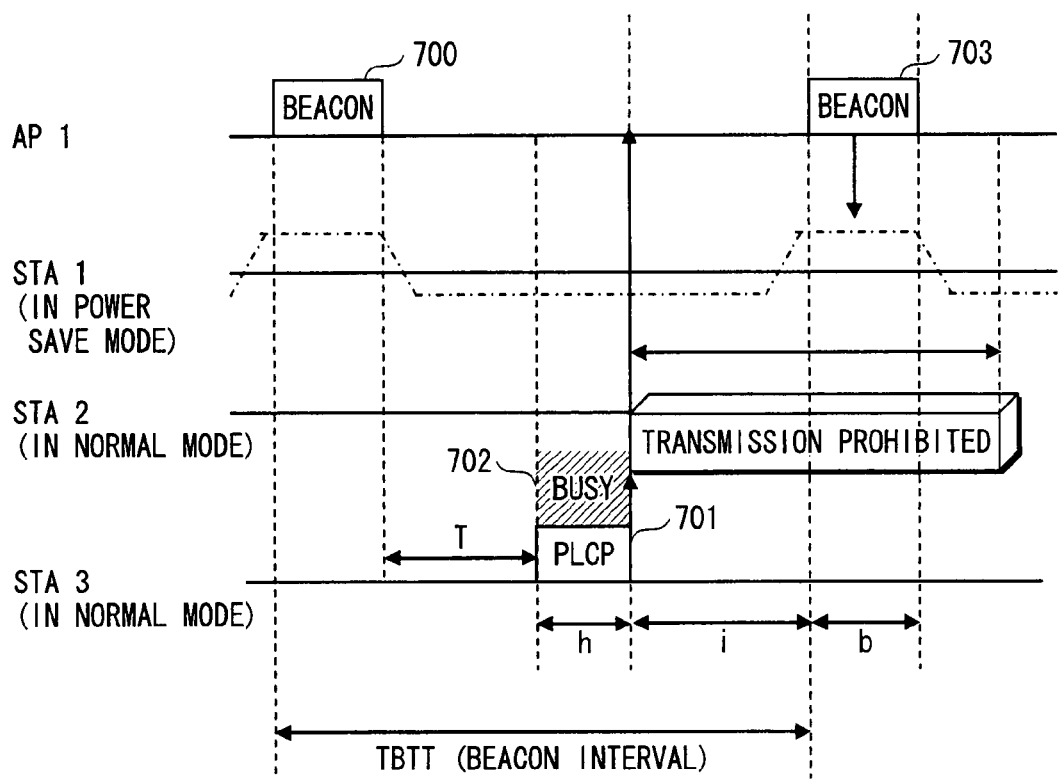
FIG. 9 shows operations of the access point 100 and the communication terminals 10 to 30 according to embodiment 6.

The following describes operations of the communication terminal 30 and the access point 100 with reference to FIG. 9.

As shown in FIG. 9, the communication terminal 10 in the wireless LAN is set to the power save mode.

First, in the access point 100, upon the timer unit 108 clocking the TBTT, the transmission frame control unit 105 generates beacon signal data, the transmission frame generation unit 106 converts the generated data to a beacon signal frame, and the wireless transmission unit 107 transmits a beacon signal 700 via the antenna 109.

The communication terminal 10 starts up the reception unit based on the TBTT in the last-received beacon signal, in order to receive the beacon signal 700.

The communication terminals 20 and 30 receive the beacon signal 700 in the same way.

Upon the timer unit 35 clocking the predetermined time T after the communication terminal 30 has received the beacon signal 700, the transmission frame control unit 32 generates a PLCP header 701, and transmits the generated PLCP header 701 via the transmission frame generation unit 33, the wireless transmission unit 34, and the antenna 36.

Accordingly, when receiving the PLCP header 701, the communication terminal 20 passes through a busy state 702 (period h) during which the PLCP header 701 is received, and thereafter ceases transmitting data for the Length period (period l), in accordance with the IEEE 802.11 standard.

After completing reception of the PLCP header 701, the access point 100 ceases transmitting data for the Length period similarly to the communication terminal 20. However, if the timer unit 108 clocks the TBTT after the period h has passed, the access point 100 ignores the data transmission prohibition, and forcedly transmits a beacon signal 703.

Here, since the time T, which is from when the beacon signal 700 has been received until when the PLCP header 701 is transmitted, satisfies the condition TBTT−Length<T<TBTT, the communication terminal 30 transmits the PLCP header 701 after receiving the beacon signal 700 and before receiving the beacon signal 703. Furthermore, the access point 100 can transmit the beacon signal 703 after the communication terminal 30 has transmitted the PLCP header 701, during the Length period (period 1) for which the communication terminal 30 ceases transmitting data.

Accordingly, the access point 100 can more reliably transmit beacon signals, and the communication terminal 10 can more reliably continue the power save mode.

Also, the access point 100 can reduce the processing load since the PLCP header is transmitted by the communication terminal 30 ahead of the beacon signal.

Furthermore, the communication terminal 30 can adjust the period for which the communication terminal 20 ceases transmitting data by adjusting the Length.

Moreover, in a case of transmitting a PLCP header, the PLCP header and the PLCP preamble may be transmitted without transmission data, thereby reducing the amount of data and suppressing the load on the network.

Embodiment 7

The following is a description of embodiment 7 with reference to the drawings.

1. Overview

In embodiment 7, communication terminals 40 and 50 (STA 4 and STA 5) have been further added to the network of the wireless LAN communication system.

In embodiments 1 to 3, the access point 100 transmits an error frame, a CTS frame, or a PLCP header ahead of the beacon signal. In embodiments 4 to 6, the communication terminal 30 transmits an error frame, a CTS frame, or a PLCP header ahead of the beacon signal transmitted by the access point 100.

In contrast, in embodiment 7 the access point 100 and any of the communication terminals work in cooperation and transmit RTS frames and CTS frames.

Figure 10:
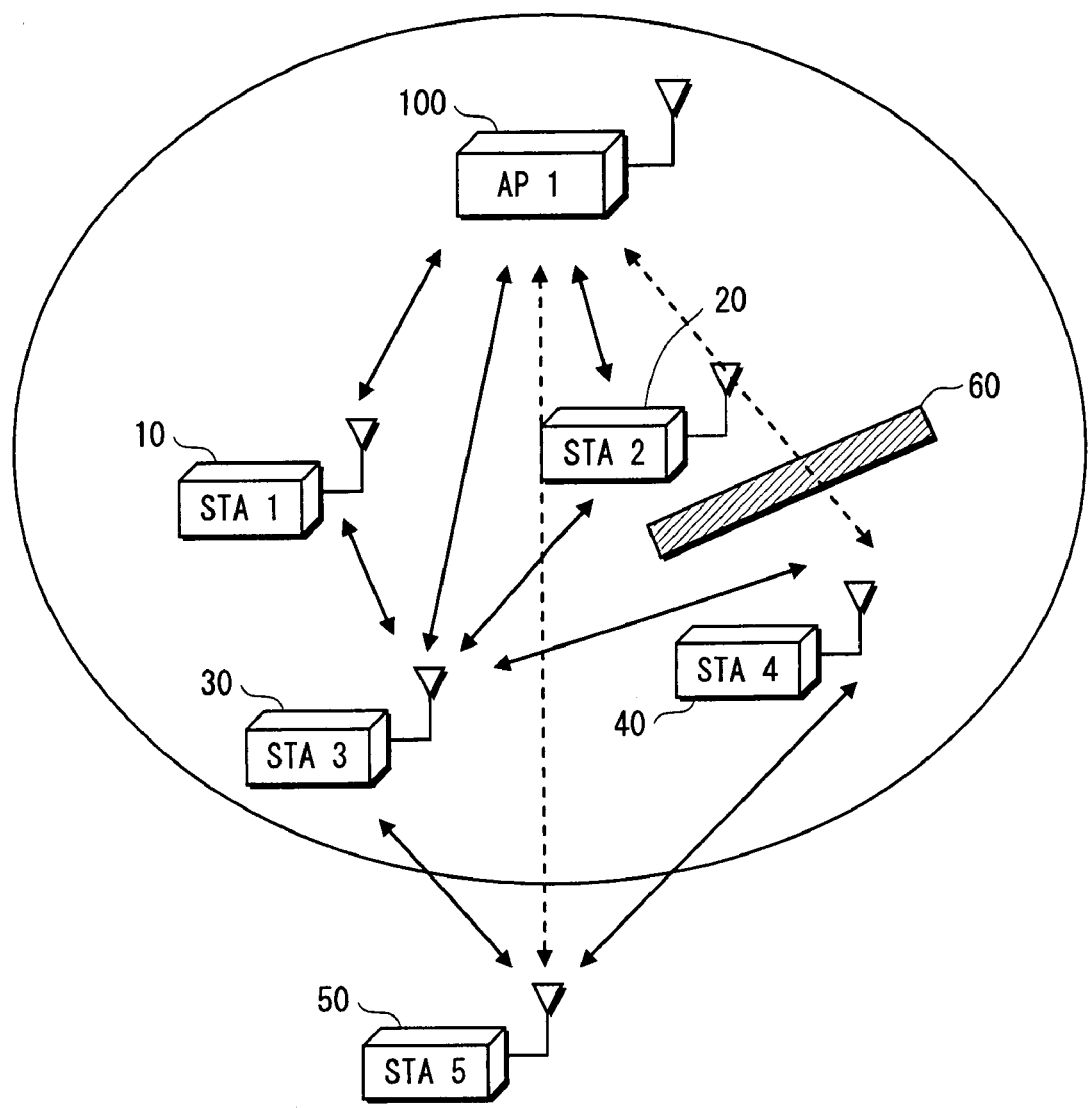
FIG. 10 shows a wireless LAN communication system according to embodiment 7.

The following describes the wireless LAN communication system pertaining to embodiment 7 with reference to FIG. 10.

As shown in FIG. 10, the wireless LAN communication system of embodiment 7 includes the communication terminals 10 to 50 (STA 1 to STA 5). The communication terminals 10 to 30 exist in a range where carrier sensing by the access point 100 is possible, whereas the access point 100 cannot perform carrier sensing with respect to the communication terminal 40 due to a blocking object 60 therebetween that blocks radio waves. The access point 100 also cannot perform carrier sensing with respect to the communication terminal 50 due the latter being outside the radio wave-reachable range in which the access point 100 can perform carrier sensing.

2-1. Structure of AP 1

The following describes a structure of the access point 100 with reference to FIG. 11.

Only aspects of the structure that differ from embodiment 1 are described below.

As shown in FIG. 11, the access point 100 additionally includes a battery level checking unit 113 in the main body 101.

The battery level checking unit 113 requests the transmission frame control unit 105 to generate a frame for inquiring battery levels, in order to check the battery levels of the communication terminals 10 to 50 in the wireless LAN communication system.

The transmission frame control unit 105 receives the request from the battery level checking unit 113, generates data for a battery level notification request frame to be transmitted to the communication terminals 10 to 50, and sends the data to the transmission frame generation unit 106.

Also, upon the timer unit 108 clocking the predetermined time T, the transmission frame control unit 105 generates RTS frame data, and sends the generated data to the transmission frame generation unit 105.

The transmission frame generation unit 106 generates a battery level notification request frame based on the data received from the transmission frame control unit 105, and sends the generated battery level notification request frame to the wireless transmission unit 107.

The timer unit 108 conforms to the IEEE 802.11 standard, and clocks the predetermined cycle TBTT for cyclical transmission of the beacon signal, and the predetermined cycle T for transmission of the RTS frame ahead of the beacon signal. More specifically, T is a predetermined time that satisfies the condition TBTT−NAV<T<TBTT.

2-2. Structure of STA 1 to STA 5

The following describes a structure of the communication terminals 10 to 50, focusing on aspects that differ from embodiment 4, and taking the example of the communication terminal 30 for the sake of convenience. The communication terminals 10 to 50 all have a similar structure.

The storage area 31 stores a battery level threshold R that is necessary when the transmission frame control unit 32 transmits a battery level notification frame.

Upon receiving an RTS frame reception notification from the reception frame control unit 37, the transmission frame control unit 32 determines a NAV to be included in the CTS frame, generates CTS frame data that includes the determined NAV, and sends the generated data to the transmission frame generation unit 33.

Also, upon receiving notification of a battery level notification request frame from the reception frame control unit 37, the transmission frame control unit 32 generates data for a battery level notification frame for notifying the battery level of the battery in the communication terminal 30, and sends the generated data to the transmission frame generation unit 33.

If reception data from the reception frame decoding unit 38 is an RTS frame, the reception frame control unit 37 sends a notification to such effect to the transmission frame control unit 32.

Also, if reception data from the reception frame decoding unit 38 is a battery level notification request frame, the reception frame control unit 37 sends a notification to such effect to the transmission frame control unit 32.

3. Data

Figure 12A:
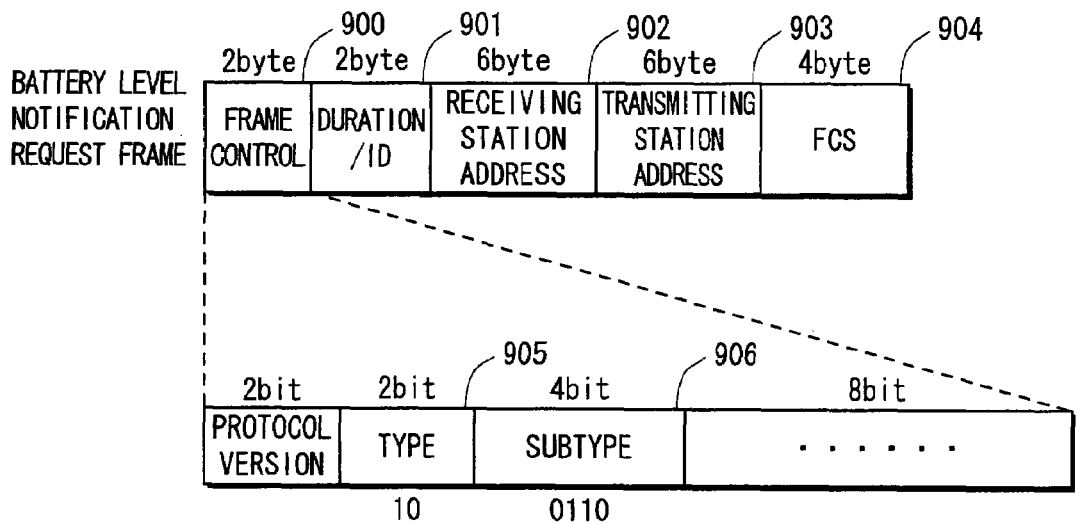
FIGS. 12A and 12B respectively show data structures of a battery power notification request frame and a battery power notification frame according to embodiment 7.
Figure 12B:
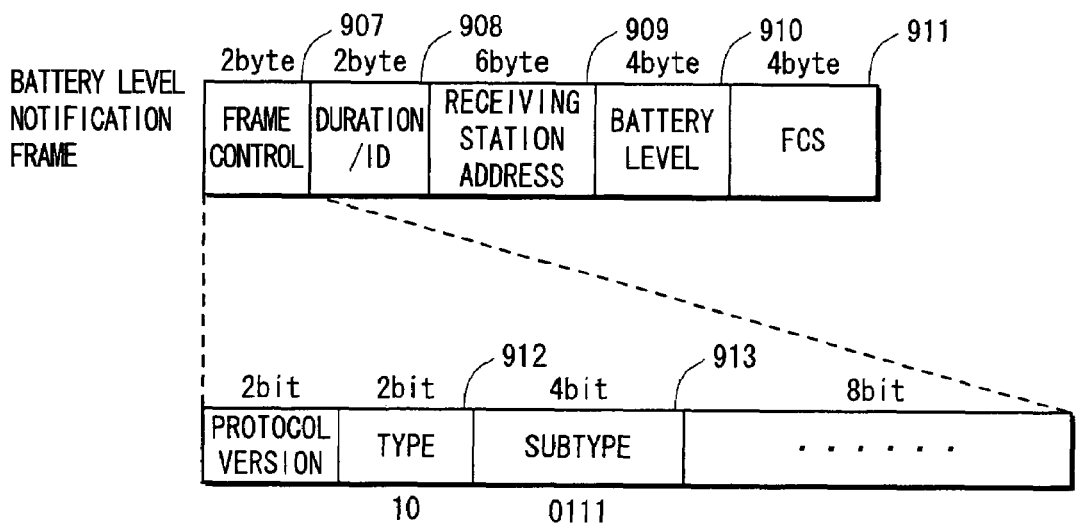

The following describes data structures of the battery level notification request frame and the battery level notification frame, with reference to FIGS. 12A and 12B.

As shown in FIG. 12A, the battery level notification request frame is composed of a frame control field 900, a duration/ID field 901, a receiving station address field 902, a transmitting station address field 903, and an FCS field 904.

The frame control field 900 consists of 2 bytes, and includes a protocol version field, a type field 905, a subtype field 906, and the like. For example, in accordance with the IEEE 802.11 standard, a value of "10" in the type field 905 indicates data. Also, values of "0000" to "1001" in the subtype field 906 indicate reserved fields. Here, the value in the subtype field 906 is "0110".

The access point 100 transmits the battery level notification request frame to the communication terminals 10 to 50 by setting the MAC addresses thereof in the receiving station address field 902.

As shown in FIG. 12B, the battery level notification frame is composed of a frame control field 907, a duration/ID field 908, a receiving station address field 909, a battery level field 910, and an FCS field 911, similarly to the battery level notification request field.

The communication terminal 30 transmits the battery level notification frame to the access point 100 by setting the MAC address thereof in the receiving station address field 909.

3. Operations

Figure 13:
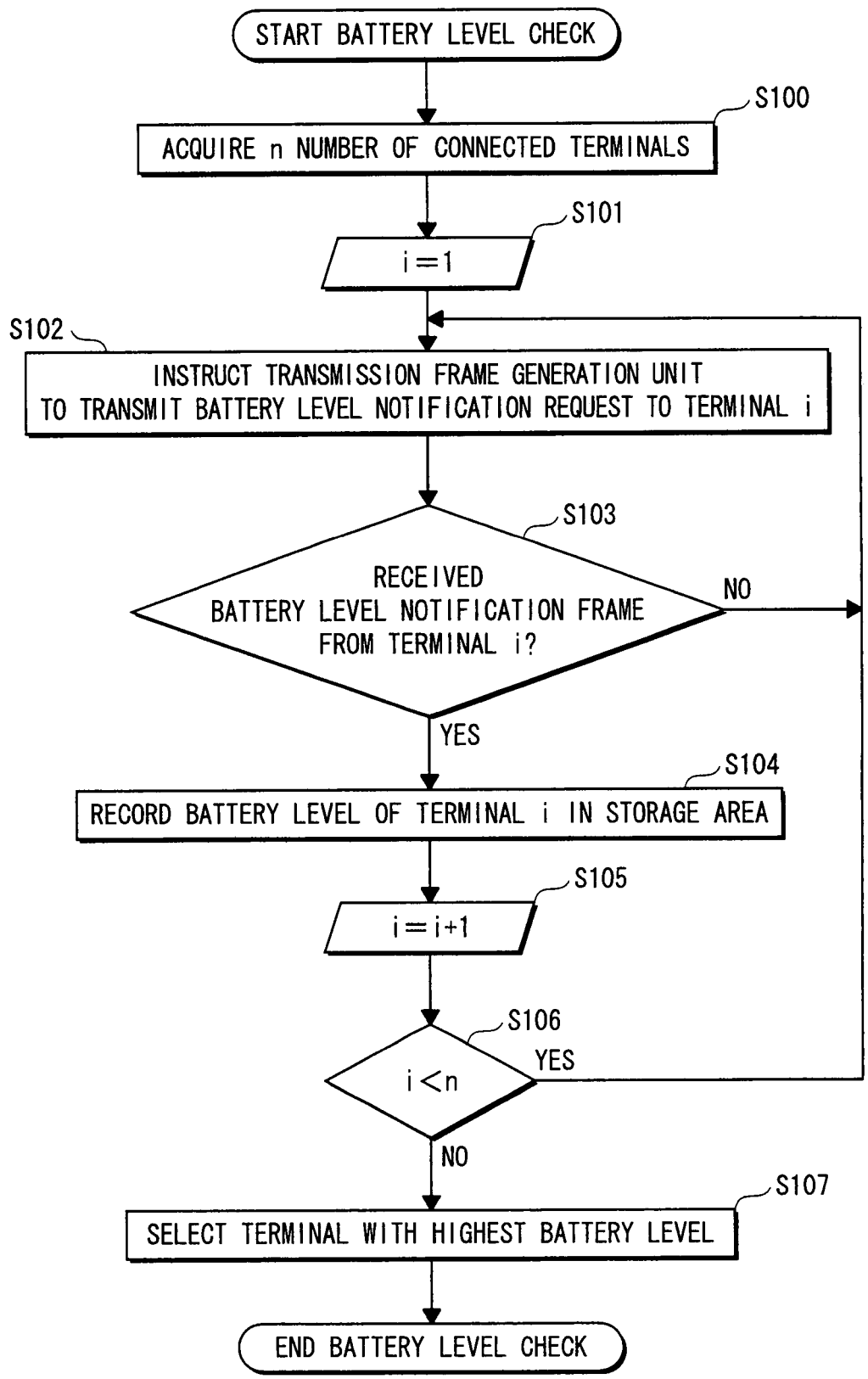
FIG. 13 is a flowchart showing operations of the access point 100 according to embodiment 7.
Figure 14:
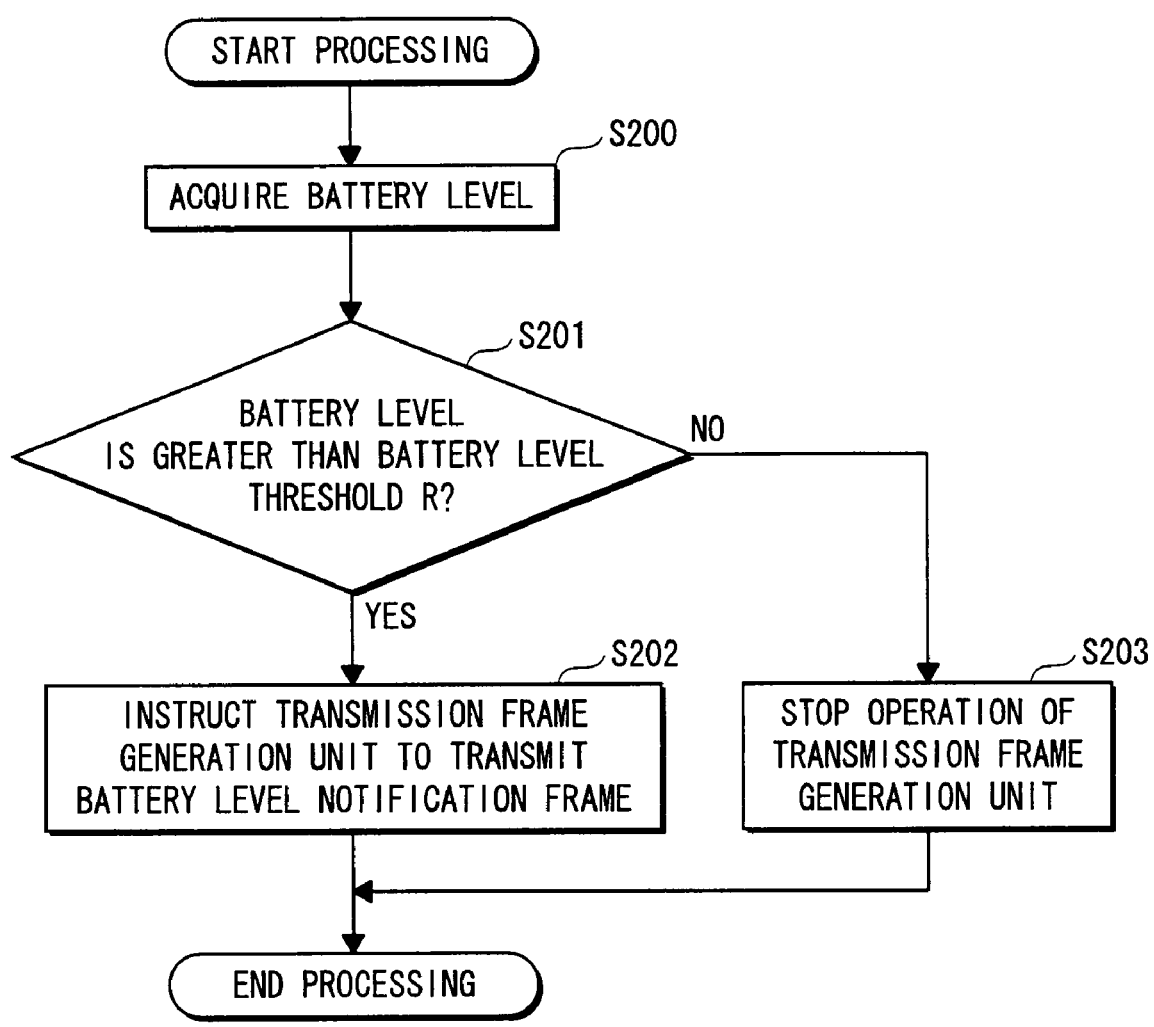
FIG. 14 is a flowchart showing operations of the communication terminal 30 according to embodiment 7.

The following describes operations of the communication terminal 30 and the access point 100 with reference to FIG. 13 to FIG. 15. Note that the depiction of FIG. 15 focuses on the communication terminals 10, 30, 40, and 50, and the communication terminal 20 has been omitted.

3-1. Operations, Part 1

First is a description of processing operations by which the access point 100 checks the battery levels of the communications terminals 10 to 50, with reference to FIG. 13.

As shown in FIG. 13, first the access point 100 acquires the number of communication terminals (5) in the wireless LAN (step S100).

The transmission frame control unit 105 initializes a variable i to "1" (step S101), and instructs the transmission frame generation unit 106 to first transmit a battery level notification request frame to the communication terminal 10 (STA 1) (step S102).

Next, upon receiving a battery level notification frame from the communication terminal 10 (S103:YES), the access point 100 stores the battery level of the communication terminal 10 in the storage area 104 (step S104).

Next, the variable i is incremented one value (step S105), and the battery level notification request frame is transmitted to the next communication terminal, as long as the battery levels of all of the communication terminals have not been checked (S106:YES).

When battery level notifications have been received from all of the communication terminals 10 to 50 (step S106:NO), the access point 100 compares the battery levels of the communication terminals stored in the storage area 104, and selects the communication terminal with the highest battery level (step S107).

3-2. Operations, Part 2

The following describes processing operations by which the communication terminal 30 notifies its battery level to the access point 100, with reference to FIG. 14.

As shown in FIG. 14, first the communication terminal 30 acquires its battery level (step S200), and if the acquired battery level is greater than the threshold R stored in the storage area 31 (S201:YES), instructs the transmission frame generation unit 33 to transmit the battery level notification frame (step S202).

On the other hand, if the acquired battery level is less than the threshold R (step S201:NO), the communication terminal 30 does not instruct the transmission frame generation unit 33 to transmit the battery level notification frame (step S203).

3-3. Operations, Part 3

The following describes processing operations by which, after the access point 100 has acquired the battery levels of the communication terminals 10 to 50, the access point 100 and the communication terminal with the highest battery level (here, the communication terminal 30) work in cooperation and transmit an RTS frame and a CTS frame, with reference to FIG. 15.

As shown in FIG. 15, the communication terminal 10 in the wireless LAN in set to the power save mode.

First, in the access point 100, upon the timer unit 108 clocking the TBTT, the transmission frame control unit 105 generates beacon signal data, the transmission frame generation unit 106 converts the generated data to a beacon signal frame, and the wireless transmission unit 107 transmits a beacon signal 800 via the antenna 109.

The communication terminal 10 starts up the reception unit based on the TBTT in the last-received beacon signal, in order to receive the beacon signal 800.

The communication terminals 20 to 40 receive the beacon signal 800 in the same way.

Upon the timer unit 108 clocking the predetermined time T after the access point 100 has transmitted the beacon signal 800, the transmission frame control unit 105 generates an RTS frame 801 addressed to the communication terminal 30, which has the highest battery level, and transmits the generated RTS frame 801 to the communication terminal 30 via the transmission frame generation unit 106, the wireless transmission unit 107 and the antenna 109.

Accordingly, when receiving the RTS frame 801, the communication terminal 30 passes through a busy state (period r) during which the RTS frame 801 is received, and thereafter transmits a CTS frame 802, which is a response signal for the RTS frame.

The communication terminals 40 and 50 receive the CTS frame 802, and cease transmitting data for the NAV period (period t).

Similarly to the communication terminals 40 and 50, the access point 100 also ceases transmitting data for the NAV period after receiving the CTS frame 802. However, if the timer unit 108 clocks the TBTT after a period s has passed, the access point 100 ignores the data transmission prohibition and forcedly transmits a beacon signal 803.

These operations enable the access point 100 to more reliably transmit beacon signals, and enable the communication terminal 10 to more reliably continue the power save mode.

In particular, the cooperation of the access point 100 and communication terminal 30 enables more reliably causing communication terminals (the communication terminals 40 and 50) for which carrier sensing by the access point 100 is not possible to cease transmitting data.

Embodiment 8

The following is a description of embodiment 8 with reference to the drawings.

1. Overview

Whereas the access point 100 and the communication terminal with the highest battery level work in cooperation and transmit RTS frames and CTS frames in embodiment 7, in embodiment 8 the access point 100 and a communication terminal with the poorest communication quality work in cooperation.

2-1. Structure of AP 1

The following describes only aspects of the structure that differ from embodiment 7.

Upon the timer unit 108 clocking a predetermined time T, the transmission frame control unit 105 generates RTS frame data, and sends the generated data to the transmission frame generation unit 106.

Upon receiving a request from the transmission frame control unit 105 to transmit an RTS frame, the transmission frame generation unit 106 compares RSSI values of the communication terminals 10 to 50 that are stored in the storage area 104, generates an RTS frame for the communication terminal with the lowest RSSI value, and sends the generated RTS frame to the wireless transmission unit 107.

The reception frame control unit 110 stores RSSI values in the storage area 104 each time any kind of signal is received from the communication terminals 10 to 50.

3. Operations

Figure 16A:
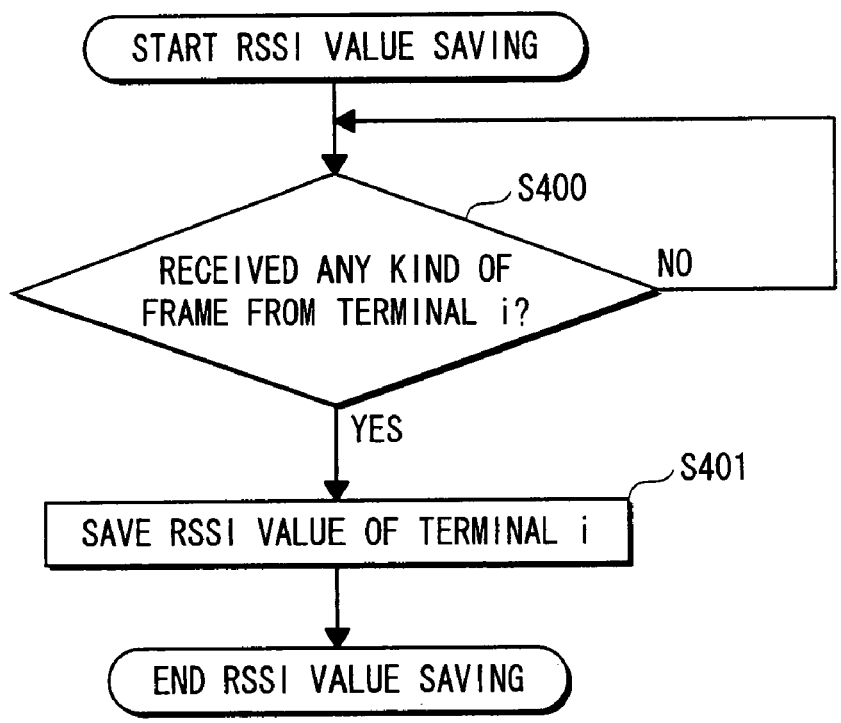
FIGS. 16A and 16B are flowcharts showing operations of the access point 100 according to embodiment 8.
Figure 16B:
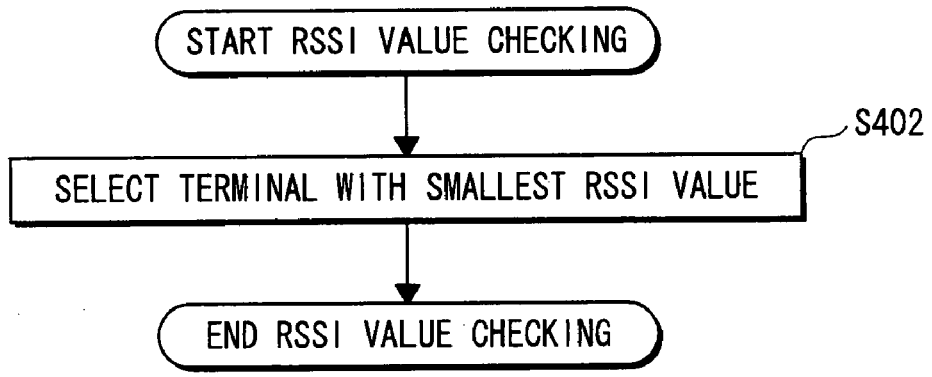

The following describes processing operations by which the access point 100 transmits an ETS frame to one of the communication terminals 10 to 50, with reference to FIGS. 16A and 16B.

As shown in FIG. 16A, each time any kind of frame is received from the communication terminals 10 to 50 (S400: YES), the access point 100 stores, in the storage area 104, an RSSI value regarding the reception (step S401).

As shown in FIG. 16B, upon the timer unit 108 clocking the predetermined time T after a beacon signal has been received, the transmission frame control unit 105 references the storage area 104 and selects the communication terminal with the lowest RSSI value (step S402).

A description of operations hereafter has been omitted since they are similar to the operations of embodiment 7 shown in FIG. 15.

By transmitting an RTS frame to the communication terminal with the lowest RSSI value in this way, the access point 100 can more reliably work in cooperation with a communication terminal existing far away from the access point 100 but barely in the area in which the access point 100 can perform carrier sensing.

This enables the communication terminal far away to more reliably transmit a CTS frame to a communication terminal with which the access point cannot perform carrier sensing due to a blocking object, and a communication terminal that has moved outside the area in which carrier sensing is possible.

Variations

Although structures of the present invention have been described above based on embodiments 1 to 7, various variations can be added to these structures.

(1) For example, although an example in which the access point 100 transmits the RTS frame to the communication terminal with the smallest RSSI value is described in embodiment 8, a threshold may be determined for the RSSI values, and the RTS frame may be transmitted only if the smallest RSSI value is below the threshold.

Figure 17A:
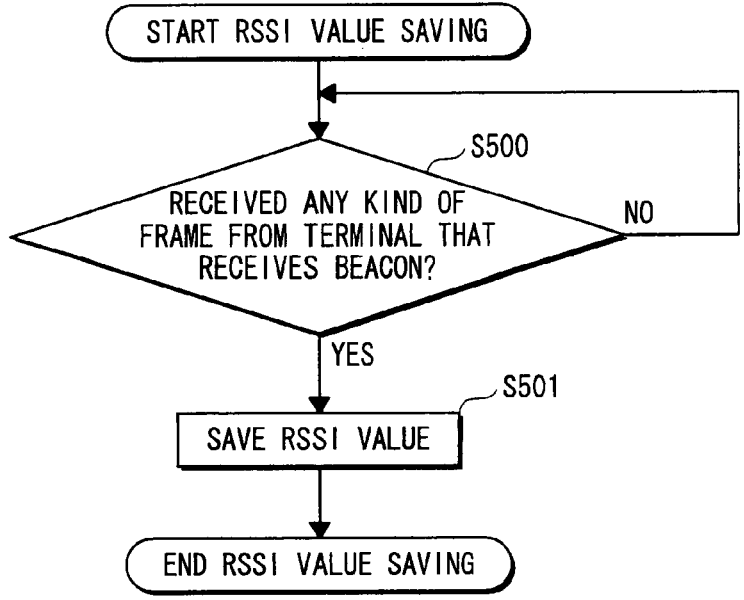
FIGS. 17A and 17B are flowcharts showing operations of the access point 100 according to a variation of the present invention.
Figure 17B:
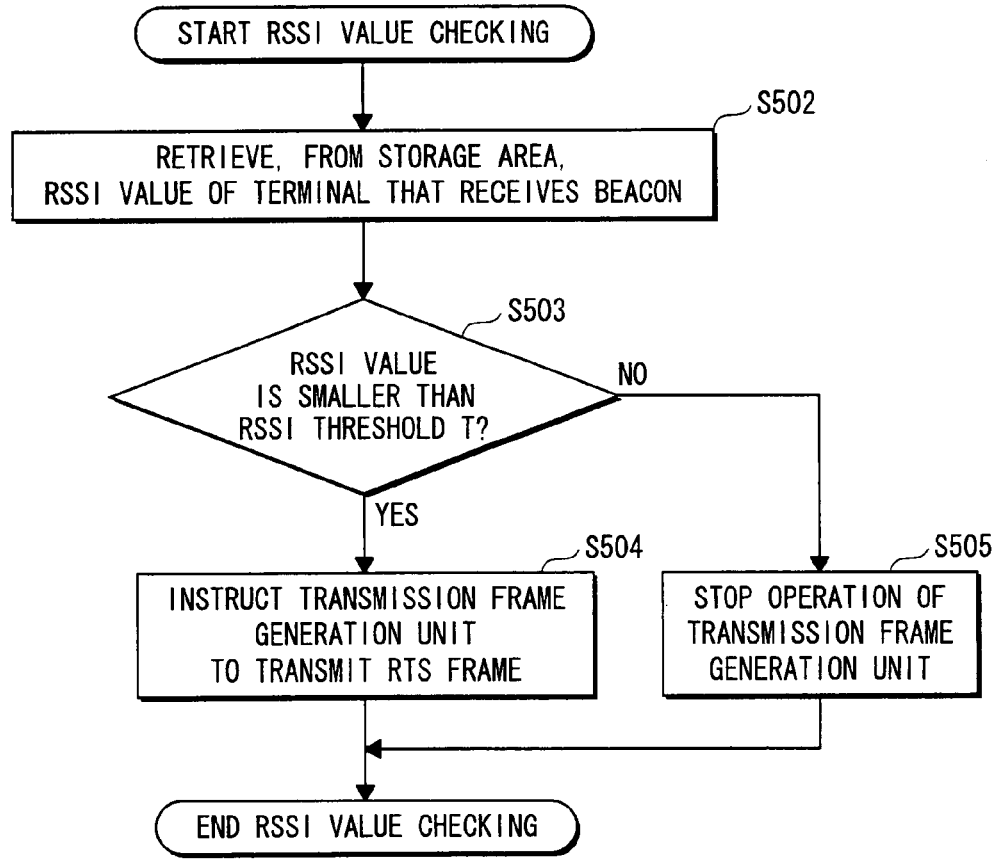

As shown in FIG. 17A, the access point 100 stores the RSSI values of the communication terminals 10 to 50 in the storage area 104 (steps S500 to S501). As shown in FIG. 17B, if the smallest RSSI value read from the storage area 104 is lower than the predetermined threshold (S503:YES), the access point 100 instructs the transmission of the RTS frame (step S504). Also, if the smallest RSSI value is greater than or equal to the threshold (S503:NO), the RTS frame is not transmitted (step S505).

(2) As another example, although the access point 100 stores RSSI values each time any kind of frame is received the communication terminal 10 to 50 in embodiment 8, the access point 100 may voluntarily transmit a frame for checking the RSSI values.

Figure 18:
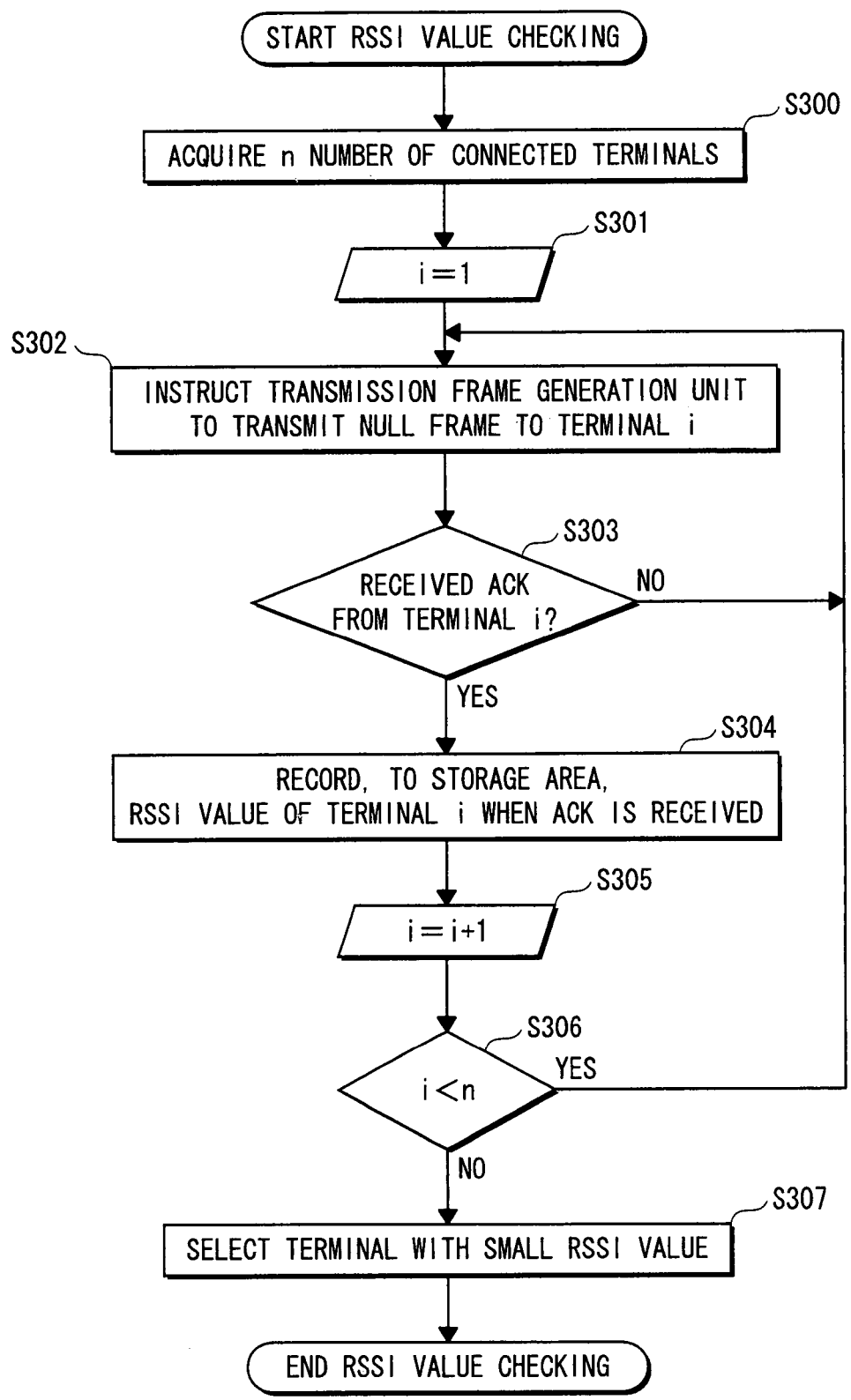
FIG. 18 is a flowchart showing operations of the access point 100 according to another variation of the present invention.

As shown in FIG. 18, the access point 100 first acquires the number of communication terminals (5) in the wireless LAN (step S300).

The transmission frame control unit 105 initializes the variable i to "1", and instructs the transmission frame generation unit 106 to transmit a NULL frame to the communication terminal 10 (STA 1) first (step S302).

Next, upon receiving an ACK signal from the communication terminal 10 (S303:YES), the access point 100 stores an RSSI value pertaining to the communication terminal 10 in the storage area 104 (step S304).

Next, the variable i is incremented one value (step S305), and the NULL frame is transmitted to the next communication terminal, as long as the communication qualities of all of the communication terminals have not been checked (S306: YES).

When ACK signals have been received from all of the communication terminals 10 to 50 (S306:NO), the access point 100 compares the RSSI values of the communication terminals stored in the storage area 104, and selects the communication terminal with the lowest RSSI value (step S307).

Exemplary Combination

Furthermore, the above-described access point and communication terminals can be combined to construct a wireless LAN.

Figure 19:
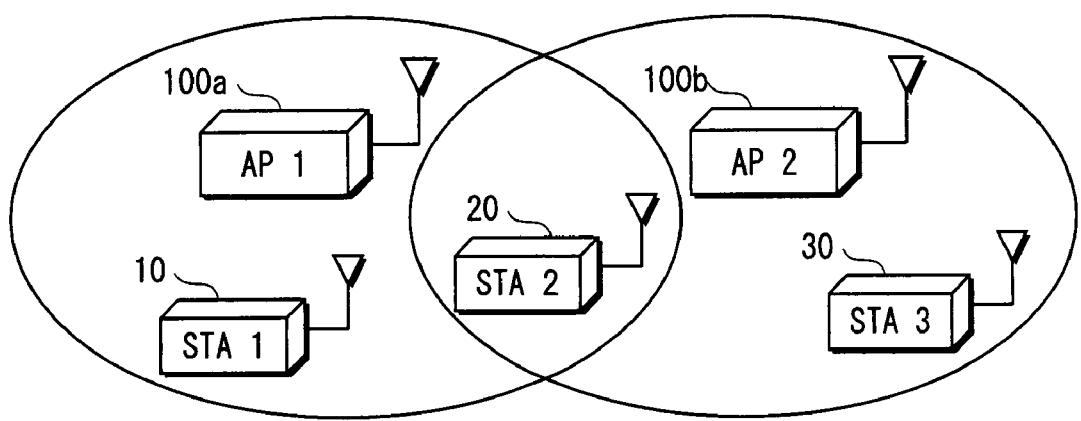
FIG. 19 shows a wireless LAN communication system according to an exemplary combination.

For example, as shown in FIG. 19, a wireless LAN composed of an access point 100a (AP 1) and communication terminals 10 and 20 (STA 1 and STA 2) is combined with a wireless LAN composed of an access point 100b (AP 2), the communication terminal 20 (STA 2) and a communication terminal 30 (STA 3).

The access point 100a and the communication terminal 20 have structures as described in embodiment 4.

Figure 20:
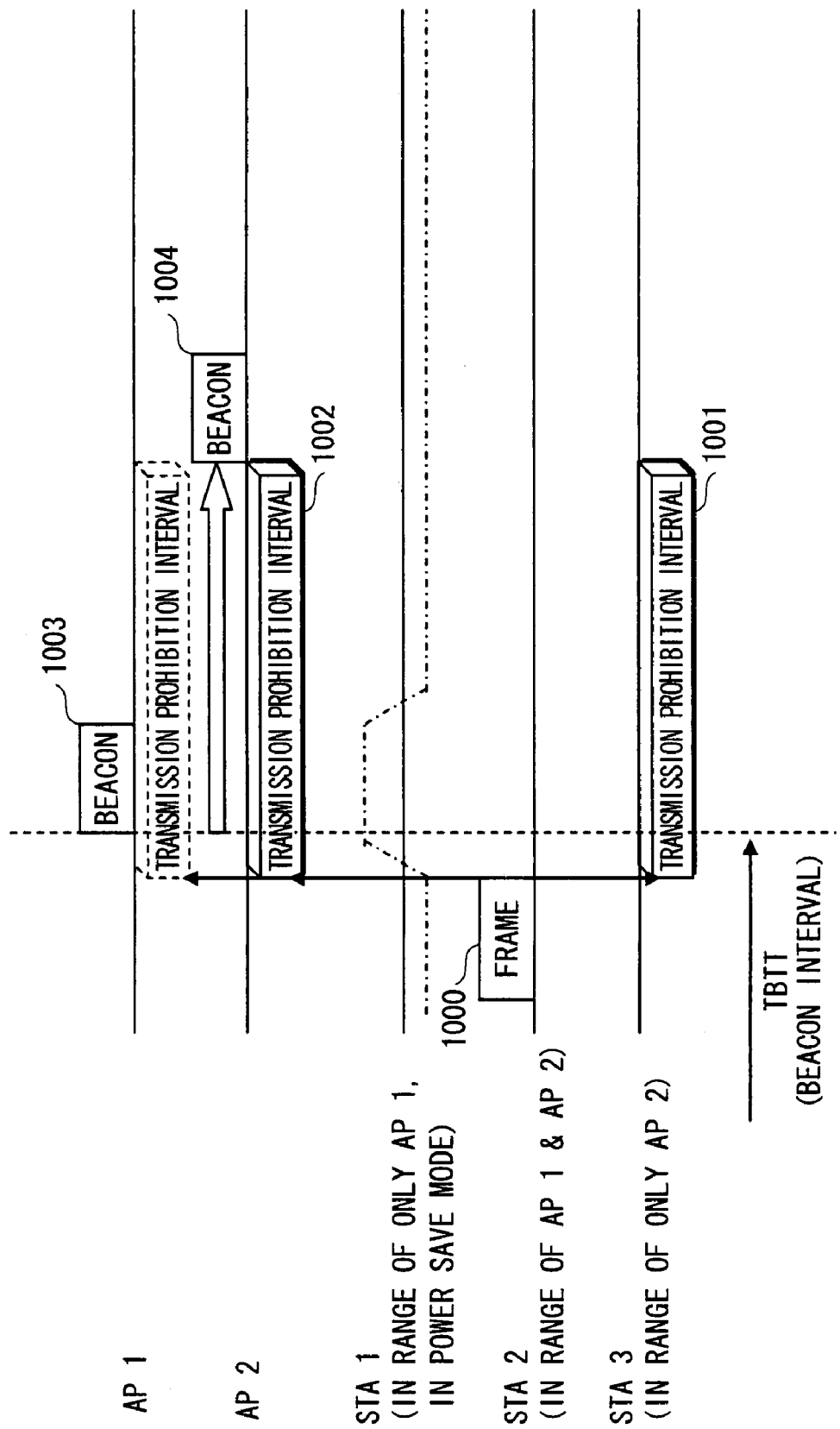
FIG. 20 is a flowchart showing operations of access points 100a and 100b and the communication terminals 10 to 30 according to the exemplary combination.
Figure 21:
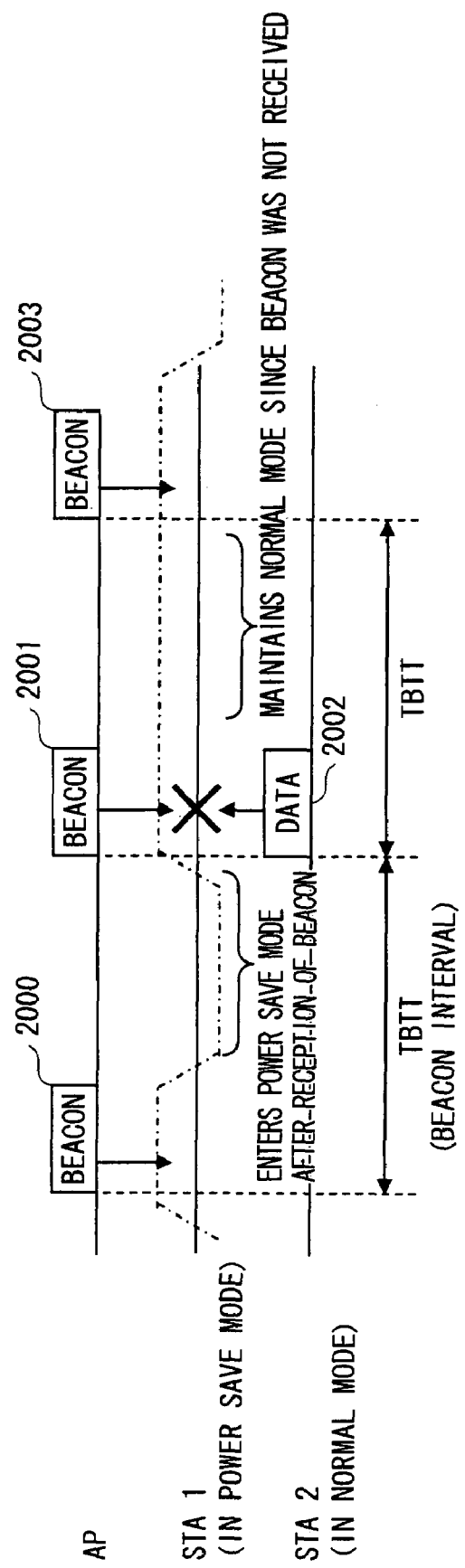
FIG. 21 shows operations of a conventional access point and communication terminals.

The following describes operations of the access points 100a and 100b and the communication terminals 10 to 30 with reference to FIG. 20.

As shown in FIG. 20, the communication terminal 10 is currently set to the power save mode.

Here, after the communication terminal 20 transmits an error frame 1000 ahead of transmission of a beacon signal 1003, the access point 100b and the communication terminal 30 cease transmitting data for IFS+back-off periods 1001 and 1002 respectively. The access point 100a also ceases transmitting data for the IFS+back-off period, but upon reaching a timing for transmission of the beacon signal 1003, ignores the transmission prohibition and forcedly transmits the beacon signal 1003.

The access point 100b can transmit a beacon signal 1004 once the transmission prohibition interval has passed.

Since only the access point 100a ignores the transmission prohibition interval and transmits a beacon signal, a collision between beacon signals from the access points 100a and 100b can be prevented, and the access point 100a can more reliably transmit a beacon signal at an appropriate timing.

This enables preventing the communication terminal 10 from reverting from the power save mode after failing to receive the beacon signal 1003.

Utilizing access points and communication terminals of the present invention in this way enables the operation of a wireless LAN communication system with priority over another wireless LAN communication system.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A relay apparatus that relays communication between a plurality of communication terminals in accordance with access control by CSMA/CA method, the relay apparatus comprising:

a transmission unit operable to transmit, to the plurality of communication terminals, a beacon signal at a predetermined time interval Tb, and a predetermined signal for causing the plurality of communication terminals to cease signal transmission for a predetermined time period t; and a control unit operable to control the transmission unit to transmit the predetermined signal upon elapse of a predetermined time period T after transmission of the beacon signal, the predetermined time period T satisfying Tb−t<T<Tb.

2. The relay apparatus of claim 1, wherein
each of the communication terminals has a power save mode for suppressing consumption of battery power therein, and remains in the power save mode in a case of receiving the beacon signal at the predetermined time interval Tb.

3. The relay apparatus of claim 1, wherein
the plurality of communication terminals and the relay apparatus comply with IEEE 802.11 standard,
the predetermined signal is an error frame, and
the predetermined time period t is a total of an Inter frame space (IFS) period and a back-off period that are specified in the IEEE 802.11 standard.

4. The relay apparatus of claim 1, wherein
the plurality of communication terminals and the relay apparatus comply with IEEE 802.11 standard,
the predetermined signal is a clear to send (CTS) frame specified in the IEEE 802.11 standard, and
the predetermined time period t is a period indicated by a network allocation vector (NAV) included in the clear to send (CTS) frame.

5. The relay apparatus of claim 1, wherein
the plurality of communication terminals and the relay apparatus comply with IEEE 802.11 standard,
the predetermined signal is a physical layer convergence protocol (PLCP) header specified in the IEEE 802.11 standard, and
the predetermined time period t is a period indicated by a Length included in the physical layer convergence protocol (PLCP) header.

6. A relay apparatus that, in accordance with access control by CSMA/CA method, mediates communication between a plurality of communication terminals, the relay apparatus and the plurality of communication terminals ceasing signal transmission for a predetermined time period t upon receiving a signal, the relay apparatus comprising:
a transmission unit operable to transmit a signal to the plurality of communication terminals; and
a control unit operable to control the transmission unit to, exclusively in a case of transmitting a beacon signal, perform transmission regardless of the predetermined time period t.

7. A communication system including a plurality of communication terminals and a relay apparatus that, in accordance with access control by CSMA/CA method in compliance with IEEE 802.11 standard, relays communication between the plurality of communication terminals, the plurality of communication terminals and the relay apparatus ceasing signal transmission for a predetermined time period t upon receiving a signal,
the relay apparatus comprising:
a reception unit operable to receive a clear to send (CTS) frame;
a transmission unit operable to transmit, to the plurality of communication terminals, a beacon signal at a predetermined time interval Tb, and an read to send (RTS) frame; and
a control unit operable to control the transmission unit to transmit the read to send (RTS) frame upon elapse of a predetermined time period T after transmission of the beacon signal, the predetermined time period T satisfying Tb−t<T<Tb, and each of the communication terminals comprising:
a reception unit operable to receive the read to send (RTS) frame and the clear to send (CTS) frame;
a transmission unit operable to, upon reception of the read to send (RTS) frame, transmit a clear to send (CTS) frame in response thereto to the relay apparatus and the other one or more of the communication terminals; and
a control unit operable to control the transmission unit of the communication terminal to, upon reception of the clear to send (CTS) frame, cease signal transmission for a period indicated by a network allocation vector (NAV) included in the received clear to send (CTS) frame.

8. The communication system of claim 7, wherein
the control unit of each of the communication terminals is further operable to check a battery level in the communication terminal,
the transmission unit of each of the communication terminals is further operable to transmit a signal indicating the checked battery level to the relay apparatus,
the reception unit of the relay apparatus is further operable to receive the signal indicating the checked battery level from each of the communication terminals, and
the transmission unit of the relay apparatus transmits the read to send (RTS) frame to, from among the plurality of communication terminals, a communication terminal having a highest battery level.

9. The communication system of claim 7, wherein
the control unit of each of the communication terminals is further operable to check a communication quality thereof,
the transmission unit of each of the communication terminals is further operable to transmit a signal indicating the communication quality to the relay apparatus,
the reception unit of the relay apparatus is further operable to receive the signal indicating the communication quality from each of the communication terminals, and
the transmission unit of the relay apparatus transmits the read to send (RTS) frame to, from among the plurality of communication terminals, a communication terminal having a worst communication quality.

10. A communication terminal that performs communication with another communication terminal via a relay apparatus in accordance with access control by CSMA/CA method, the communication terminal comprising:
a reception unit operable to receive a beacon signal from the relay apparatus at a predetermined time interval Tb, and a predetermined signal for ceasing signal transmission for a predetermined time period t;
a transmission unit operable to transmit the predetermined signal to the relay apparatus and the another communication terminal upon elapse of a predetermined time period T after reception of the beacon signal, the predetermined time period T satisfying Tb−t<T<Tb; and
a control unit operable to control the transmission unit to, upon reception of the predetermined signal, cease signal transmission for the predetermined time period t.

11. The communication terminal of claim 10, wherein
the communication terminal and the relay apparatus comply with IEEE 802.11 standard,
the predetermined signal is an error frame, and
the predetermined time period t is a total of an Inter frame space (IFS) period and a back-off period that are specified in the IEEE 802.11 standard.

12. The communication terminal of claim 10, wherein
the communication terminal and the relay apparatus comply with IEEE 802.11 standard, the predetermined signal is a clear to send (CTS) frame specified in the IEEE 802.11 standard, and the predetermined time period t is a period indicated by a network allocation vector (NAV) included in the clear to send (CTS) frame.

13. The communication terminal of claim 10, wherein the communication terminal and the relay apparatus comply with IEEE 802.11 standard, the predetermined signal is a physical layer convergence protocol (PLCP) header specified in the IEEE 802.11 standard, and the predetermined time period t is a period indicated by a Length included in the physical layer convergence protocol (PLCP) header.

14. A semiconductor integrated circuit comprising:

a transmission unit operable to transmit, to an external device, a beacon signal at a predetermined time interval Tb, and a predetermined signal for causing the external device to cease signal transmission for a predetermined time period t; and a control unit operable to control the transmission unit to transmit the predetermined signal upon elapse of a predetermined time period T after transmission of the beacon signal, the predetermined time period T satisfying $Tb-t<T<Tb$.

15. A semiconductor integrated circuit comprising:

a reception unit operable to receive a beacon signal from an external device at a predetermined time interval Tb, and a predetermined signal for ceasing signal transmission for a predetermined time period t;

a transmission unit operable to transmit the predetermined signal to the external device upon elapse of a predetermined time period T after reception of the beacon signal, the predetermined time period T satisfying $Tb-t<T<Tb$; and a control unit operable to control the transmission unit to, upon reception of the predetermined signal, cease signal transmission for the predetermined time period t.

* * * * *